(12) United States Patent
Huang et al.

(10) Patent No.: US 11,389,702 B2
(45) Date of Patent: Jul. 19, 2022

(54) APPARATUS AND METHOD FOR MARKING A BALL CENTER OF GRAVITY POSITION

(71) Applicants: Dick's Sporting Goods, Inc., Coraopolis, PA (US); Foremost Golf Mfg., Ltd., Taipei (TW)

(72) Inventors: Chia-Sheng Huang, Taipei (TW); Chia-Cheng Wu, Changhwa (TW); Chih-Sheng Tseng, Changhwa (TW)

(73) Assignees: Dick's Sporting Goods, Inc., Coraopolis, PA (US); Foremost Golf Mfg., Ltd., Taipei (TW)

( * ) Notice: Subject to any disclaimer, the term of this patent is extended or adjusted under 35 U.S.C. 154(b) by 79 days.

(21) Appl. No.: 16/379,956

(22) Filed: Apr. 10, 2019

(65) Prior Publication Data
US 2020/0298065 A1   Sep. 24, 2020

(30) Foreign Application Priority Data
Mar. 20, 2019   (TW) .................. 108109589

(51) Int. Cl.
| | | |
|---|---|---|
| *B41M 1/40* | (2006.01) | |
| *G01M 1/12* | (2006.01) | |
| *A63B 45/02* | (2006.01) | |
| *A63B 37/00* | (2006.01) | |

(52) U.S. Cl.
CPC .......... *A63B 45/02* (2013.01); *A63B 37/0022* (2013.01); *G01M 1/122* (2013.01)

(58) Field of Classification Search
CPC ....... G01M 1/122; A63B 45/02; Y10S 101/40
See application file for complete search history.

(56) References Cited

U.S. PATENT DOCUMENTS

| | | | | |
|---|---|---|---|---|
| 4,546,644 | A | * 10/1985 | Beny ................... | A63B 47/008 473/353 |
| 6,319,563 | B1 | * 11/2001 | Skrabski ............ | A63B 37/0003 427/261 |
| 7,283,657 | B1 | * 10/2007 | Carlson .................. | A63B 45/02 382/100 |
| 7,299,685 | B1 | 11/2007 | Burnett | |
| 2002/0134257 | A1 | * 9/2002 | Stephenson ............ | B41J 3/4073 101/35 |
| 2002/0189468 | A1 | * 12/2002 | Sosin ................. | A63B 37/0003 101/35 |

(Continued)

FOREIGN PATENT DOCUMENTS

| | | |
|---|---|---|
| CN | 104302366 A | 1/2015 |
| JP | 2002204840 A  * | 7/2002 |
| JP | 2009080080 A | 4/2009 |

(Continued)

*Primary Examiner* — Jill E Culler
*Assistant Examiner* — Ruben C Parco, Jr.
(74) *Attorney, Agent, or Firm* — Fox Rothschild LLP

(57) ABSTRACT

An apparatus and method of indicating the ball center of gravity position. The method of indicating the ball center of gravity position includes the following step of: moving the ball to a rotating member of a rotating device; driving the rotating member to rotate the ball along a axis of rotation of the rotating device, and adjust the center of gravity of the ball corresponding to the position of the rotating device; moving the ball onto a first carrier of a first transport device; and marking an identification mark on a predetermined area of the ball.

14 Claims, 22 Drawing Sheets

(56) References Cited

U.S. PATENT DOCUMENTS

2003/0166819 A1* 9/2003 Dewanjee ............ B29C 39/021
  528/44
2009/0110837 A1* 4/2009 Wachi ................ B05B 13/0264
  427/385.5

FOREIGN PATENT DOCUMENTS

| KR | 101266061 B1 | 5/2013 |
| KR | 101482175 B1 | 1/2015 |
| TW | M536564 U | 2/2017 |

* cited by examiner

APPARATUS AND METHOD FOR MARKING A BALL CENTER OF GRAVITY POSITION

CROSS-REFERENCE TO RELATED APPLICATIONS

The present application claims priority to the Taiwan patent application no. 108109589, filed Mar. 20, 2019, the disclosure of which is incorporated by reference in its entirety.

BACKGROUND

The present disclosure relates to a method for marking an identification mark on a surface of a sphere (e.g., ball), in particular to an apparatus for marking a ball center of gravity position and a method of marking the ball center of gravity position.

First of all, the golf movement has always been regarded as a leisure activity of business people. However, in recent years, with the improvement of people's living standards and the emphasis on leisure life, more and more people from all walks of life and different ages enjoy golf. Golf has gradually become a national sport. However, the performance of the golf ball itself (for example, the ability to strike a golf ball at a point closest to its true center of gravity) affects the flight direction and flight distance of the golf ball after hitting the ball, and also determines the controllability of the ball.

Then, since the golf ball inevitably may have a slight error in the manufacturing process, the center of gravity of the golf ball may not be located on the center of the ball. The center of gravity of an object is a point from which the weight of a body or system may be considered to act. In uniform gravity it is the same as the center of mass. In order to solve the technical problem of locating the true center of gravity for a golf ball, the prior art, for example, CN Patent No. 104302366A (The mass production method of a true spin golf ball) mainly uses salt water to float a golf ball to find the center of gravity of the golf ball, and then to mark the upper center of the golf ball at a position corresponding to the closest point to the center of gravity of the golf ball. However, in the above-mentioned CN Patent No. 104302366A, the golf ball must be immersed in the brine, and the golf ball must be additionally washed and dried, which will cause process complexity.

In addition, the prior art, for example, U.S. Pat. No. 7,299,685 (Golf equatorial positioning device) mainly utilizes the principle of centrifugal force to adjust the position of the golf ball so that the center of gravity and the center of the golf ball are at the equator. The cross section. At the same time, in the case where the golf ball is rotated at a high speed, the equator of the golf ball is marked with a tag pen. Thereby, the user may understand the center of gravity position of the golf ball, and adjust the way the golf ball is placed according to the demand. However, although the above-mentioned U.S. Pat. No. 7,299,685 patent may immediately find the center of gravity of the golf ball, it is not possible to mark a plurality of golf balls in a large amount. At the same time, using the label pen to mark the identification mark on the golf ball will also affect the visual aesthetic of the golf ball.

SUMMARY

The technical problem to be solved by the present disclosure is to provide an apparatus for marking the center of gravity position of a ball and a method for overcoming the deficiencies of the prior art.

In order to solve the above technical problem, one of the technical solutions adopted by the present disclosure is to provide a ball center of gravity position indicating device for marking a corresponding ball center of gravity position, the ball center of gravity position indicating device comprising: a rotating device, a first conveying device, a marking device and a reclaiming device. The rotating device includes a receiving groove for accommodating the ball, a rotating member capable of carrying the ball and disposed in the receiving groove, and a driving member capable of driving the rotating member to rotate. The ball is rotatable along an axis of rotation of the rotating device to adjust the center of gravity of the ball to correspond to the position of the rotating device. The first conveying device is adjacent to the rotating device, and the first conveying device comprises a first carrier capable of carrying the ball and a first conveying module capable of driving the displacement of the first carrier. The marking device is adjacent to the first conveying device, the marking device comprises a bearing seat capable of carrying the ball body and a marking module capable of marking an identification mark on a predetermined area of the ball body. The reclaiming device is movable between the rotating device and the first conveying device for moving the ball that has been rotated by the rotating device to the first carrier of the first conveying device, the reclaiming device being movable between the first conveying device and the marking device for moving the ball on the first carrier of the first conveying device to the second carrier of the marking device.

In order to solve the above technical problem, another technical solution adopted by the present disclosure is to provide a ball center of gravity position indication method for indicating a corresponding position of a center of gravity of a ball on the ball, and the ball center of gravity position indication method includes the following steps: moving the ball to a rotating member of a rotating device; driving the rotating member to rotate the ball along an axis of rotation of the rotating device, and adjusting the center of gravity of the ball corresponding to a position of the rotating device; moving the ball to a first carrier of a first conveying device; and marking an identification mark on a predetermined area of the ball.

One of the beneficial effects of the ball center of gravity position indicating device and method provided by the embodiments, is the ability to adjust the ball center of gravity position corresponding to the position of the rotating device followed by marking an identification mark on a predetermined area of the ball, thus forming a ball having an center of gravity position identification mark. Thereby, through the identification mark on the ball, the user may know the ball center of gravity position, and may adjust the striking position of the ball according to the requirement.

The detailed description and drawings are intended to provide a further understanding of the embodiments of the present disclosure.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

The following is a description of an embodiment of a ball center of gravity position indicating device and method. The device and method may be implemented or applied in various other specific embodiments, and various modifications and changes may be made without departing from the spirit and scope of the description. In addition, the drawings are merely illustrative and are not intended to be stated in the actual size. The following embodiments will further explain the related technical content, but the disclosure is not intended to limit the scope of the device or method.

Figure 1:
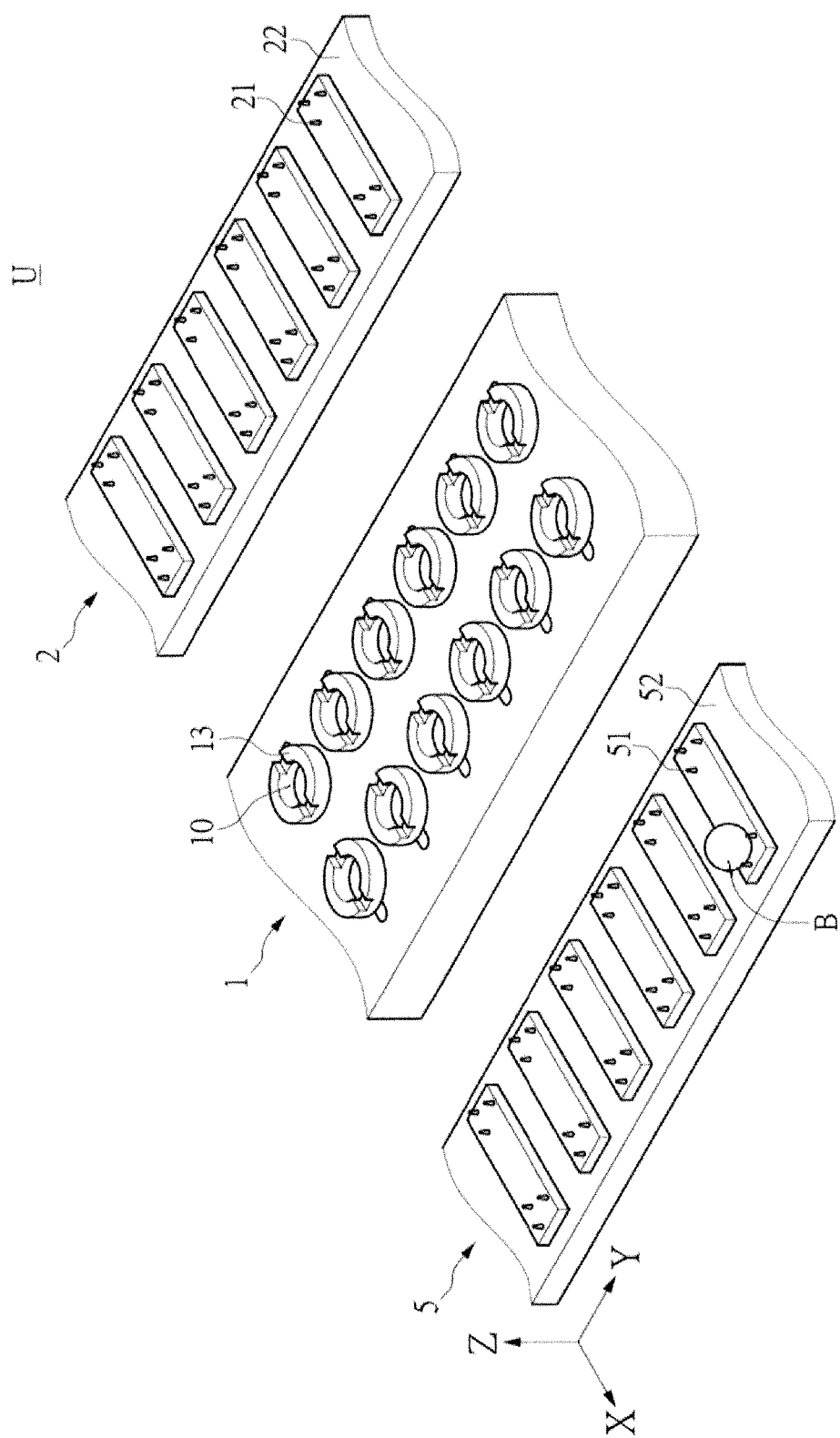
FIG. 1 is a partial perspective view of a ball center of gravity position indicating device according to a first embodiment.
Figure 2:
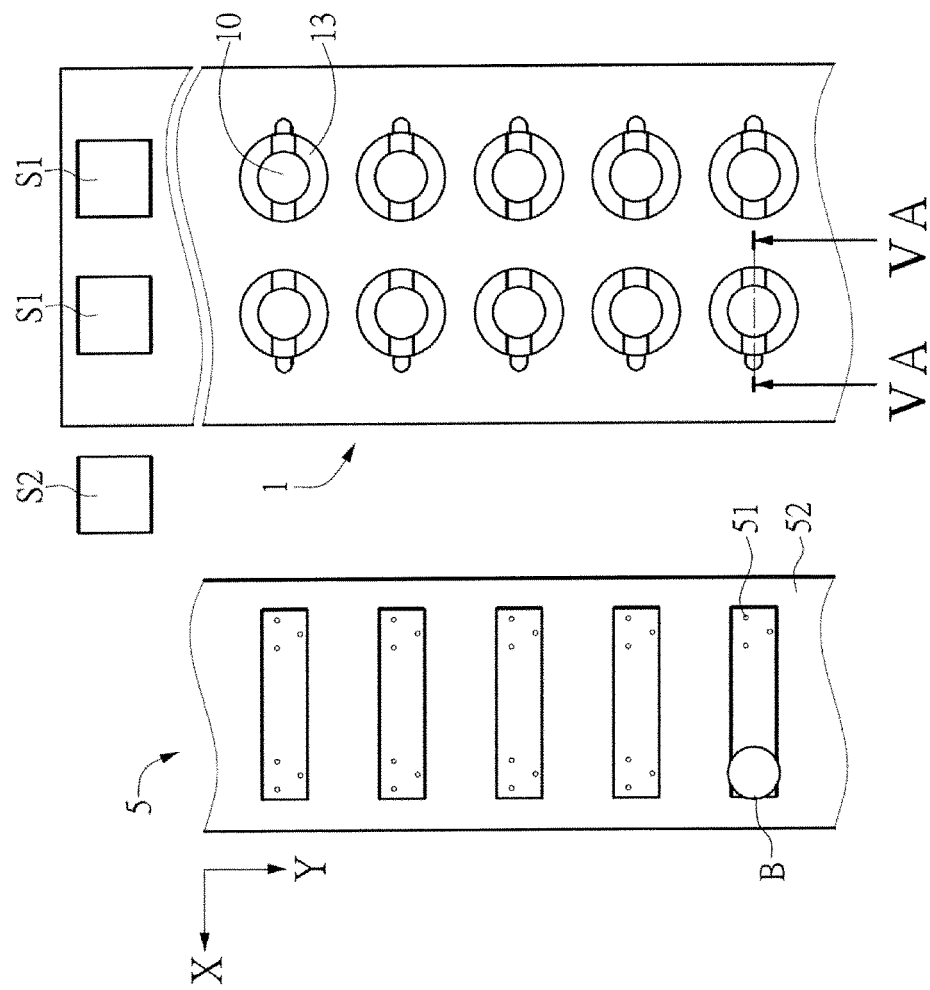
FIG. 2 is a partial top view of a ball center of gravity position indicating device according to the first embodiment.
Figure 3:
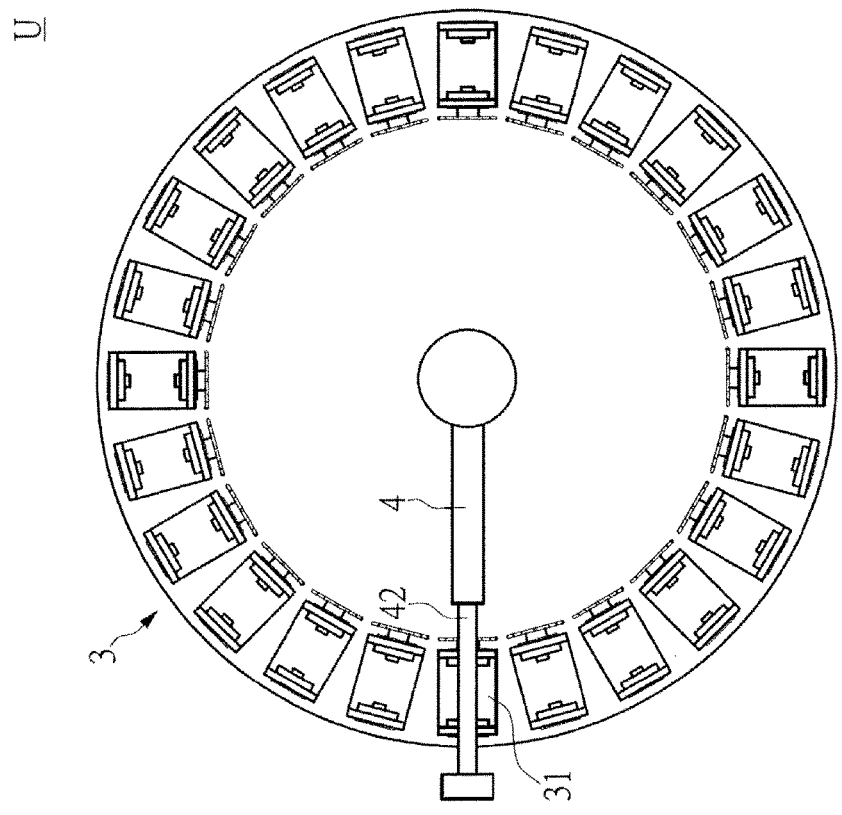
FIG. 3 is another partial top view of the ball center of gravity position indicating device according to the first embodiment.
Figure 3:
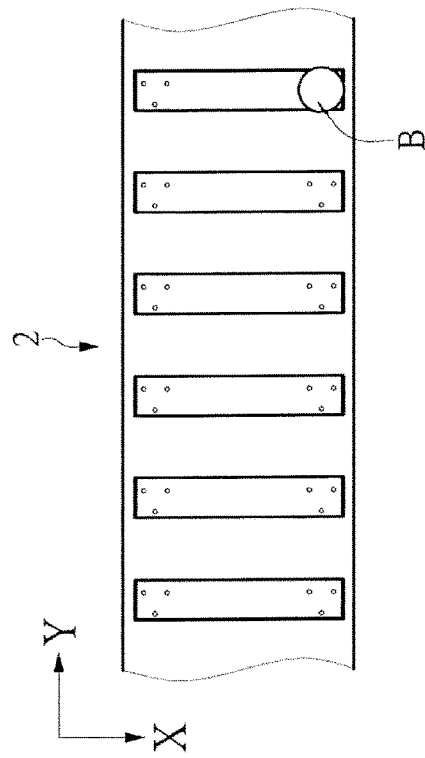
Figure 9A:
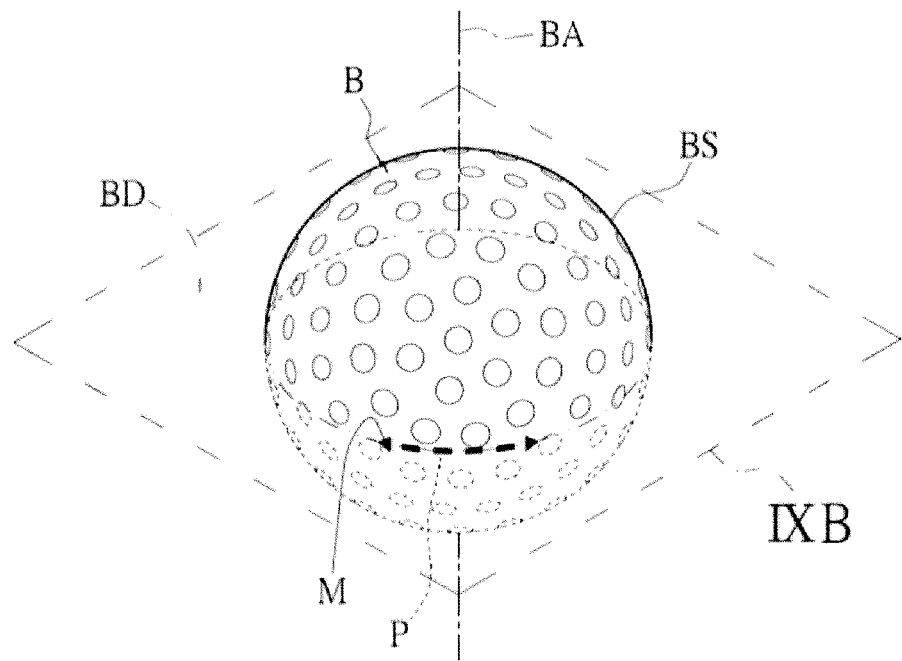
FIG. 9A is a schematic perspective view of a ball.
Figure 9B:
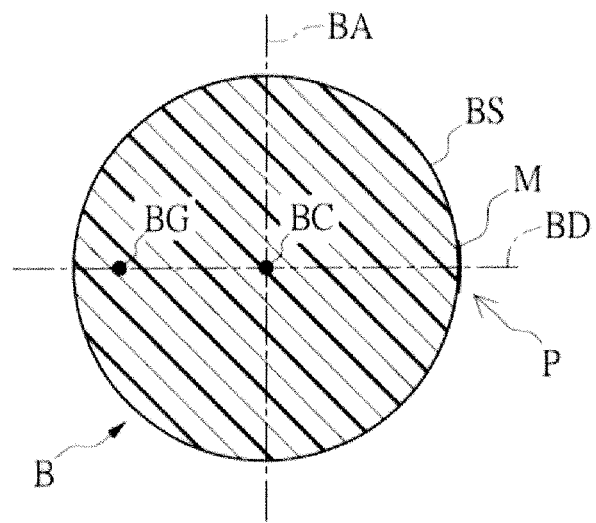
FIG. 9B is a schematic cross-sectional view of the IXB-IXB cut line of FIG. 9A.

First, refer to FIGS. 1-3, 9A and 9B together. FIG. 1 is a partial perspective view of a ball center of gravity position indicating device U according to a first embodiment, FIG. 2 is a partial top view of the ball center of gravity position indicating device U according to the first embodiment, FIG. 3 is another partial top view of the ball center of gravity position indicating device U according to the first embodiment, FIG. 9A is a schematic perspective view of a ball B, and FIG. 9B is a cross-sectional view of the IXB-IXB cut line of FIG. 9A. The first embodiment provides a ball center of gravity position indicating device U for marking the corresponding center of gravity position BG of a ball B on the outer surface BS of the ball B. It should be noted that the corresponding center of gravity position BG of the ball B means that the identification mark M corresponding to the center of gravity position BG marked on the outer surface BS of the ball B.

In the above embodiment, as shown in FIGS. 1-3, the ball center of gravity position indicating device U may include a rotating device 1, a first conveying device 2, a marking device 3, and a reclaiming device 4. Preferably, the ball center of gravity position indicating device U may further comprise a second conveying device 5. In particular, the first conveying device 2 may be adjacent to the rotating device 1. The first conveying device 2 may include a first carrier 21 capable of carrying the ball B and a first conveying module 22 capable of driving the displacement of the first carrier 21. In addition, the second conveying device 5 may be adjacent to the rotating device 1. The second conveying device 5 may include a third carrier 51 capable of carrying the ball B and a second conveying module 52 capable of driving the displacement of the third carrier 51. Further, the first conveying device 2 and the second conveying device 5 may be respectively located on both sides of the rotating device 1, and the second conveying device 5 may be a feeding device for the rotating device 1. The first conveying device 2 may be a discharging device for the rotating device 1. In other words, the ball B located on the second conveying device 5 is the ball B that has not been adjusted by the rotating device 1, and the ball B located on the first conveying device 2 is the ball B that has been adjusted by the rotating device 1.

In the above embodiment, for example, the first carrier 21 and/or the third carrier 51 may be a structure formed by three cylinders (not labeled), and the ball B may be disposed on three cylinders. However, the present disclosure is not limited thereto. In other embodiments, the first carrier 21 and/or the third carrier 51 may be in other forms, and the present disclosure does not have the needle-shaped carrier shown in FIG. 1. In addition, the first conveying module 22 and/or the second conveying module 52 may be a conveyor belt, and the first carrier 21 and the third carrier 51 may be respectively disposed on the first conveying module 22 and the second conveying module 52, so that the first conveying module 22 and the second conveying module 52 may drive the displacement of the ball B.

Next, refer to FIGS. 1-3 and 4A-4D together. FIGS. 4A-FIG. 4D are schematic diagrams showing a displacement process of a ball B from a ball center of gravity position indicating device U according to the first embodiment to a first conveying device 2 via a second conveying device 5. In the context of the disclosure, the reclaiming device 4 may be moved between the second conveying device 5 and the rotating device 1 for moving the ball B on the third carrier 51 of the second conveying device 5 to the receiving groove 10 located on the rotating device 1. In addition, the reclaiming device 4 may be moved between the rotating device 1 and the first conveying device 2 for moving the ball B that has been rotated by the rotating device 1 to the first carrier 21 of the first conveying device 2.

For the above embodiment, refer to FIGS. 4A-4D. For example, the reclaiming device 4 may include a first reclaiming module 41, and the first reclaiming module 41 may be used to move the ball B that has not been rotated by the rotating device 1 from the second conveying device 5 into the receiving groove 10 of the rotating device 1. In addition, the first reclaiming module 41 may also be used to move the ball B that has been rotated by the rotating device 1 to the first conveying device 2. The first reclaiming module 41 may include a first base 411, a first reclaiming element 412 disposed on the first base 411 and capable of clamping and moving the ball B.

In view of the above, for example, the first reclaiming element 412 may be a claw. Thereby, the first reclaiming element 412 may first clamp the ball B from the second conveying device 5, lift and move the ball B to the receiving groove 10 of the rotating device 1, and then the first reclaiming element 412 may release the claw (first reclaiming element 412) placing the ball B on the rotating device 1. The receiving groove 10 of the rotating device 1 is aligned with the first carrier 21 of the first conveying device 2. In other words, the first reclaiming module 41 may move the ball B on the third carrier 51 of the second conveying device 5 into the receiving groove 10 of the rotating device 1, and the first reclaiming module 41 may move the ball B that has been rotated by the rotating device 1 to the first carrier 21 of the first conveying device 2. It should be noted that the first reclaiming module 41 may further include a track (not shown), and the first base 411 is slidably disposed on the track, thereby causing displacement of the first base 411 on the track. The displacement on the upper side may drive the displacement of the first reclaiming element 412 together. In addition, the manner of displacement of the first base 411 on the track is a technique known to those skilled in the art, and details are not described herein again. In addition, for example, preferably, the material of the first reclaiming element 412 may be a polyurethane reactive glue (PUR glue, e.g., hot melt glue) to prevent the first reclaiming element 412 from causing damage to the outer surface BS of the ball B during the process of clamping the ball B. However, it should be noted that the present disclosure is not limited by the material.

Figure 5A:
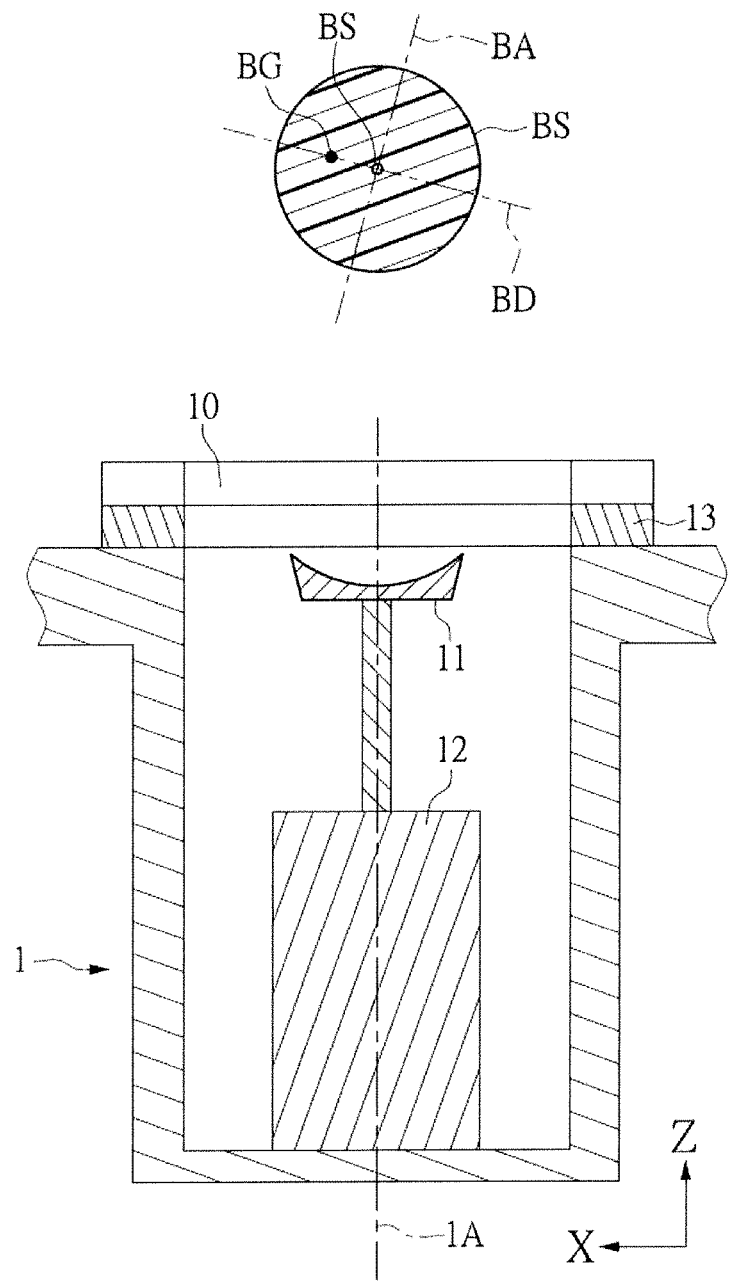
FIGS. 5A to 5C are schematic diagrams showing the rotation process of the ball from the ball center of gravity position indicating device on a rotating device according to the first embodiment.
Figure 5B:
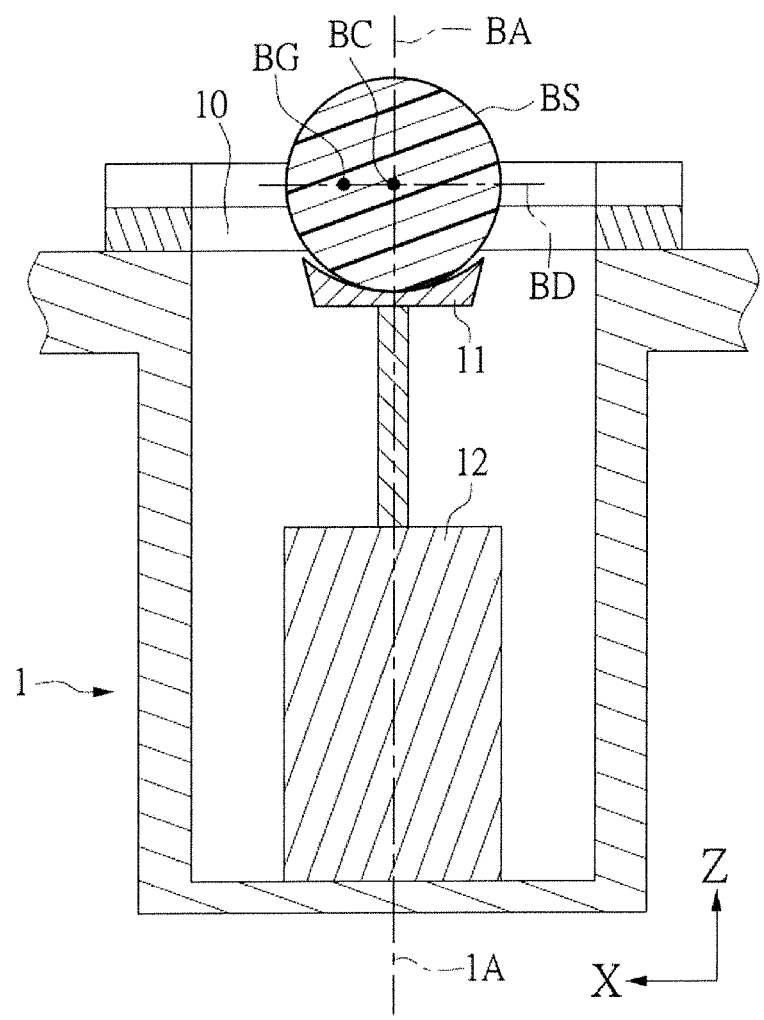
Figure 5C:
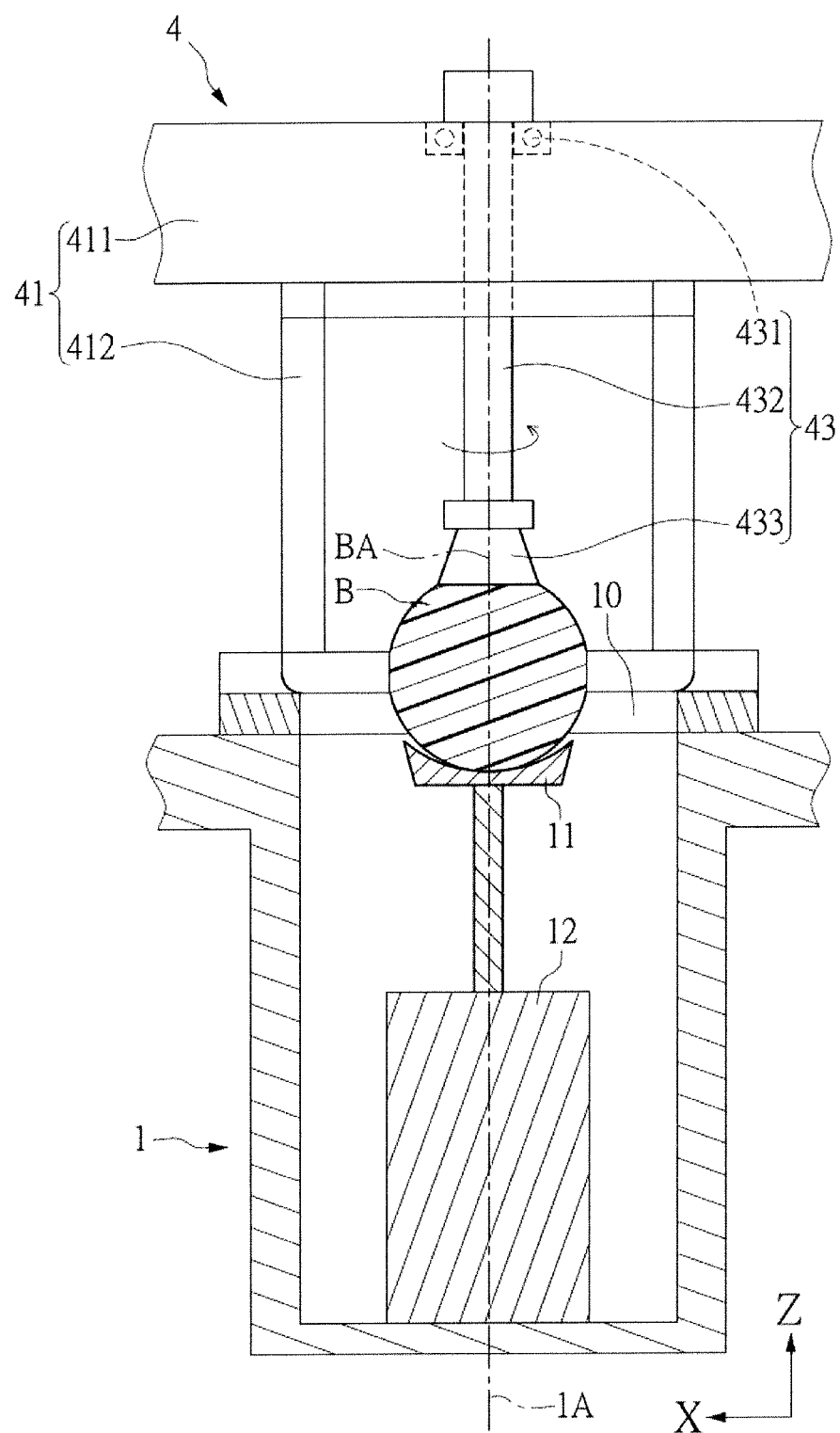

Next, refer to FIGS. 9A, 9B, and 5A-5C. FIGS. 5A-5C are diagrams showing the rotation process of the ball B on the rotating device 1 of the ball center of gravity position indicating device U according to the first embodiment. The following will further explain how the rotating device 1 adjusts the corresponding position of the ball B, that is, how the rotating device 1 adjusts the center of gravity position BG of the ball B corresponding to the position of the rotating device 1 in order to facilitate the subsequent steps. The marking device 3 marks an identification mark M corresponding to the center of gravity position BG of the ball B.

As described above, the ball B shown in FIG. 5A is the ball B which has not been adjusted by the rotating device 1. The ball B may include a core center BC, a center of gravity BG, a reference plane BD passing through the center of gravity BG and the core center BC, and a central axis BA passing through the core center BC and perpendicular to the reference plane BD. It should be noted that the reference plane BD will also overlap with the cross section of the largest cross-sectional area of the ball B, and the reference plane BD may extend toward the outer surface BS of the ball B. In other words, if the reference plane BD is a cross section, the contour of the reference plane BD cut on the outer surface BS of the ball B is the equator of the ball B. In addition, the rotating device 1 may include a receiving groove 10 for receiving the ball B, a rotating member 11 capable of carrying the ball B and disposed in the receiving groove 10, and a driving member 12 capable of driving the rotating member 11 to rotate (for example, but not limited to, motors). Thereby, when the rotating member 11 drives the ball B to rotate, the ball B may rotate along an axis of rotation 1A of the rotating device 1. In addition, preferably, the rotating device 1 may further include a ball guard ring 13 which may be arranged to prevent the rotating ball B from being deformed (e.g., scratched, scraped, scarred, defaced, blemished, roughened, etc.) by the inner walls of the receiving groove 10. Preferably, the material of the ball guard ring 13 is an Ultra High Molecular Weight Polyethylene (UHMW PE), thereby preventing the outer surface BS of the ball B from being scratched due to high-speed rotation, but the present disclosure is not limited thereto.

As described above, as shown in FIG. 5B, when the rotating member 11 drives the ball B to rotate, it may utilize the principle of centrifugal force, and the center of gravity BG of the adjusting ball B corresponds to the position of the rotating device 1. Thereby, the position of the reference plane BD shown in FIG. 5A may be adjusted to the position of the reference plane BD shown in FIG. 5B. Further, the reference plane BD of the ball B rotated by the rotating device 1 may be perpendicular to the axis of rotation 1A of the rotating device 1, and the reference plane BD of the ball B rotated by the rotating device 1 may be parallel to an initial plane (in the drawings, the initial plane may be an XY plane), and the axis of rotation 1A of the rotating device 1 and the central axis BA of the ball B are parallel.

Figure 4A:
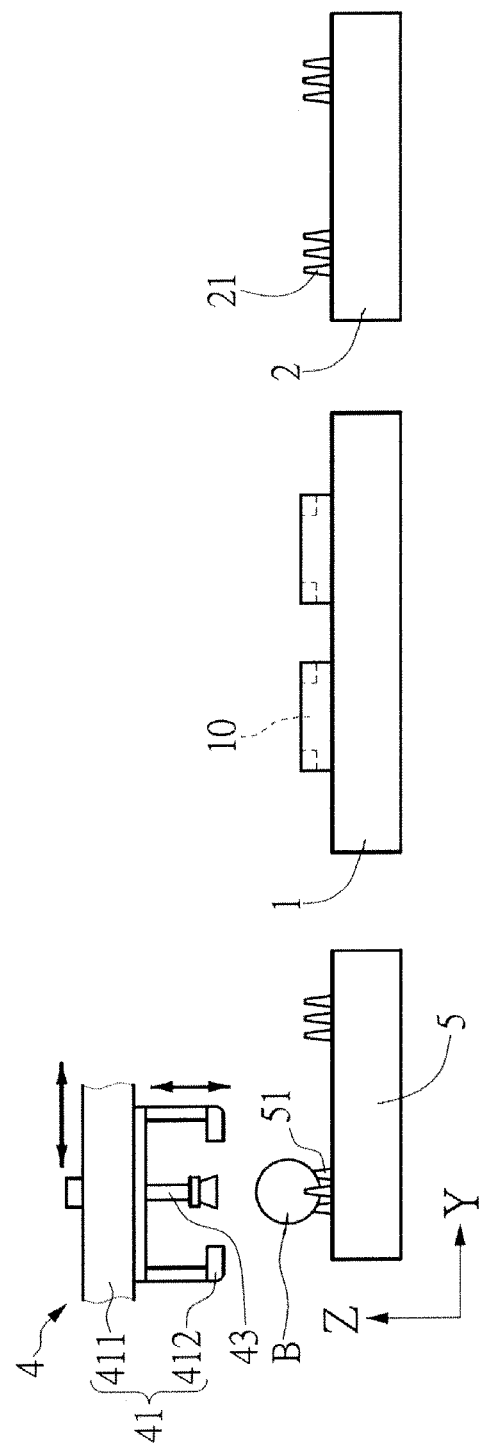
FIGS. 4A to 4D are schematic diagrams showing a displacement process of a ball from a ball center of gravity position indicating device according to the first embodiment to a first conveying device via a second conveying device.
Figure 4B:
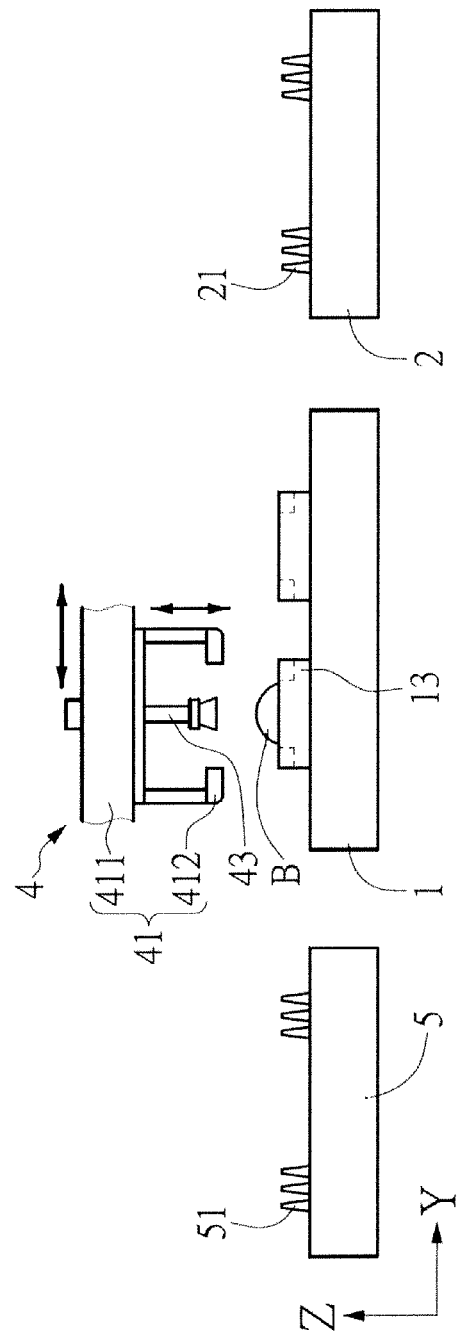
Figure 4C:
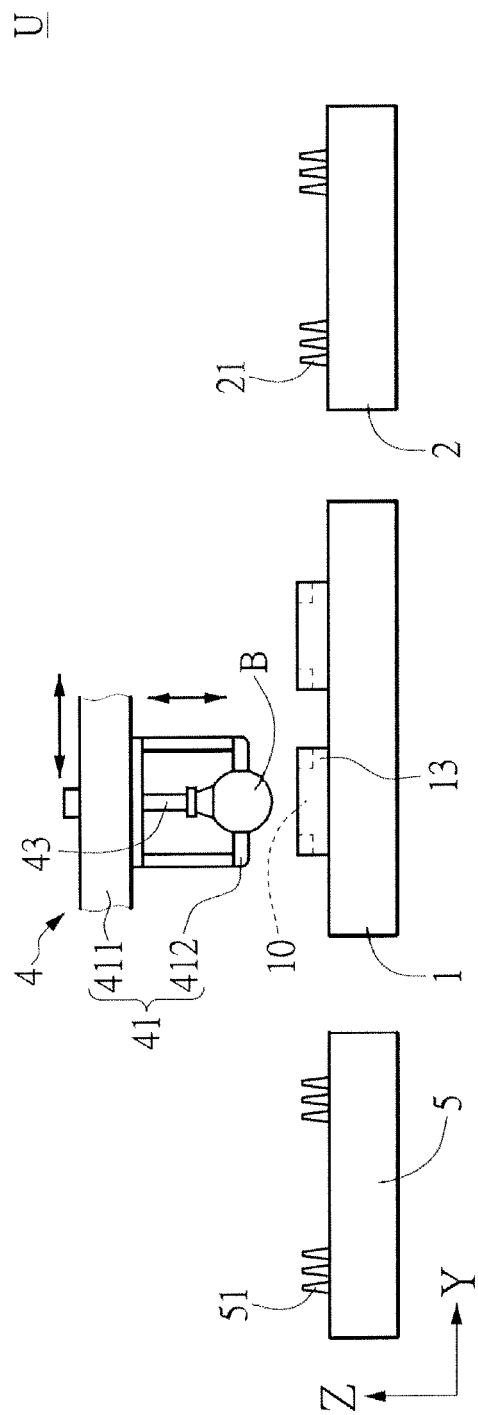
Figure 4D:
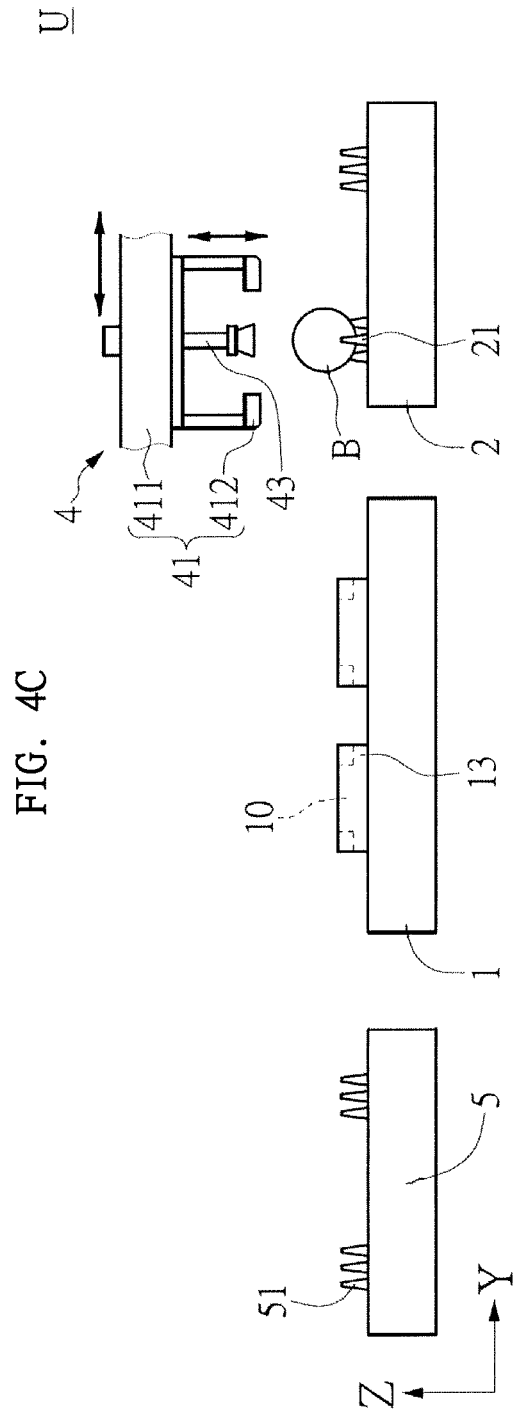

As shown in FIG. 5C, and as shown in FIG. 4B and FIG. 4C, the first reclaiming module 41 of the reclaiming device 4 may further include a deceleration module 43. Corresponding to the rotation of the first base 411 and against the ball B, the rotation speed of the ball B is lowered. For example, the deceleration module 43 may include a bearing 431 disposed on the first base 411, a rod 432 disposed on the bearing 431, and an abutting member 433 disposed on the rod 432 for abutting on the ball B. Preferably, the abutting member 433 may be a dish-shaped suction cup, and the abutting member 433 may be a soft and flexible material to avoid scratching the ball B. Thereby, since the abutting member 433 may freely rotate via the bearings 431 corresponding to the first base 411, when the abutting member 433 abuts against the ball B, a pressure may be applied to the ball B to achieve the effect of deceleration. Then, when the ball B is decelerated to a predetermined speed or is completely stopped, the ball B may be moved to the first conveying device 2 by the first reclaiming element 412. In addition, it should be noted that although the first reclaiming element 412 is exemplified by a claw, in other embodiments, the first reclaiming element 412 may also be integrated with the deceleration module 43 so that assembly formed by the integration of the first reclaiming element 412 and the deceleration module 43 is a dish-shaped suction cup having the function of capturing the ball B via suction and moving the ball B also via suction.

Figure 6A:
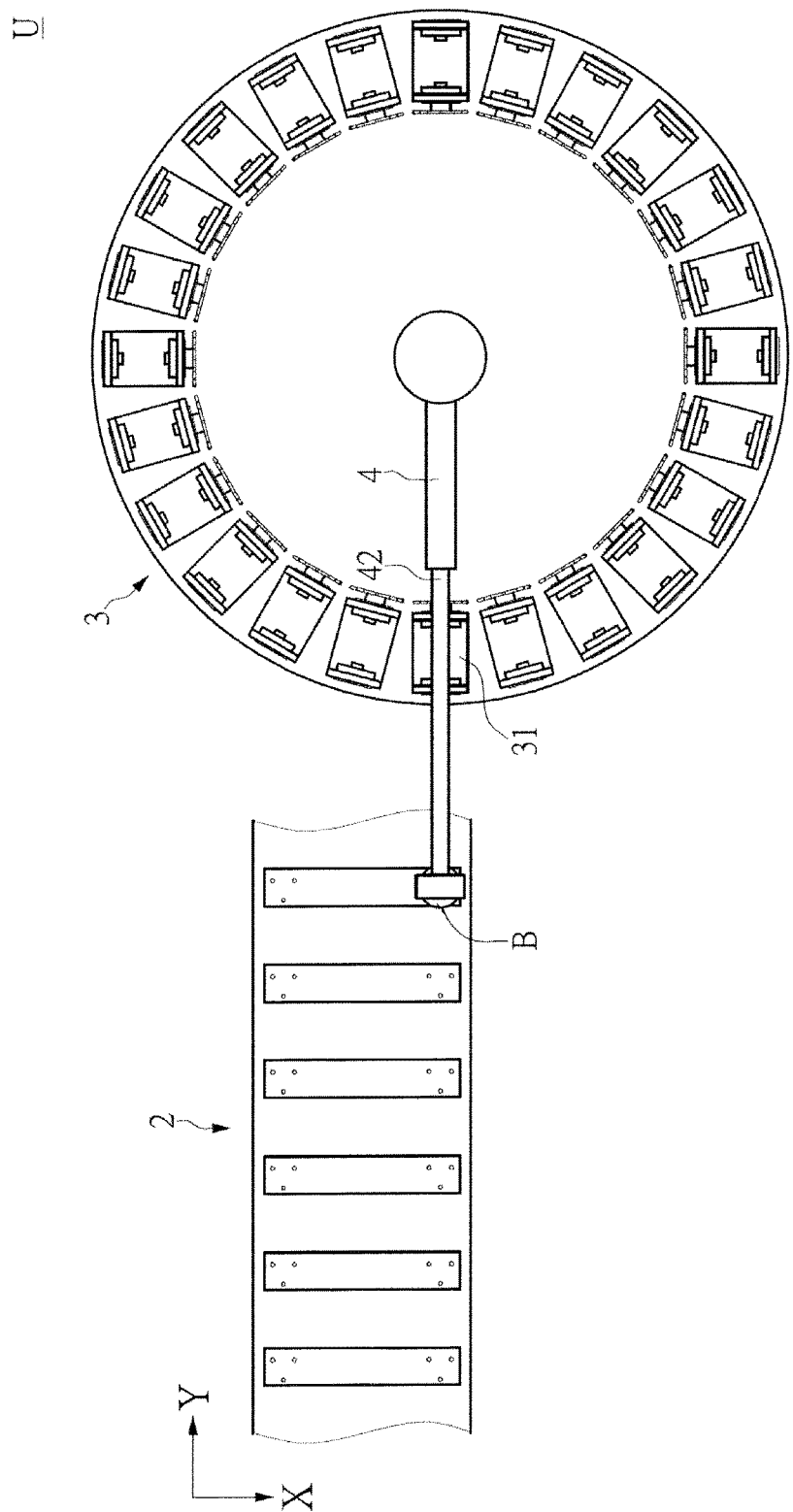
FIGS. 6A to 6C are schematic diagrams showing the displacement process of the ball from the ball center of gravity position indicating device according to the first embodiment to the marking device via the first conveying device.
Figure 6B:
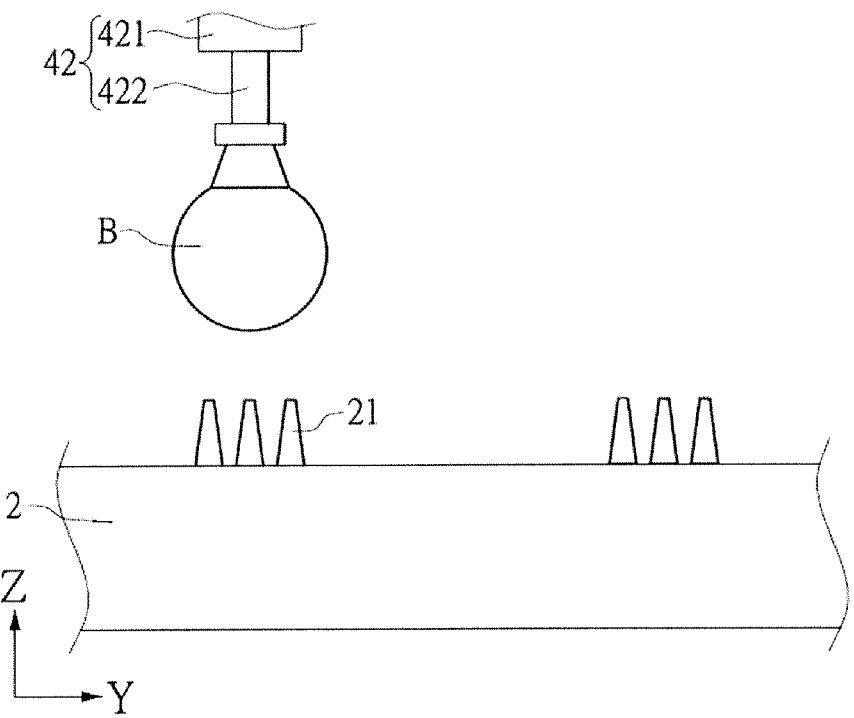
Figure 6C:
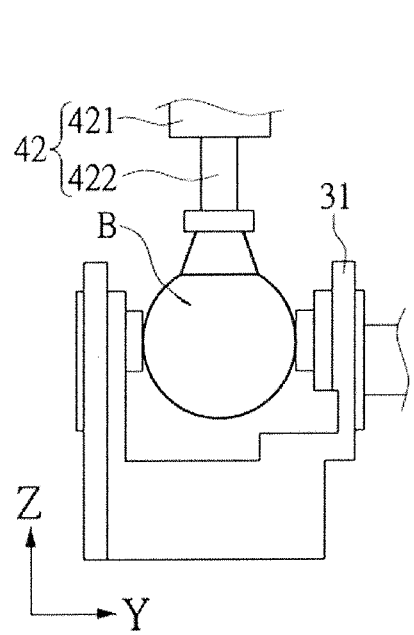

Next, refer to FIGS. 3 and 6A-6C together. FIGS. 6A-6C are diagrams showing the ball B of the ball center of gravity position indicating device U of the first embodiment moved to the marking device 3 via the first conveying device 2. The reclaiming device 4 is movable between the first conveying device 2 and the marking device 3 for moving the ball B on the first carrier 21 of the first conveying device 2 to a second carrier 31 of the marking device 3. In addition, FIGS. 3 and 6A are top views of the reclaiming device 4 above the first conveying device 2, FIG. 6B is a side view of the reclaiming device 4 above the first conveying device 2, and FIG. 6C is a side view of the reclaiming device 4 above the marking device 3.

As shown in FIGS. 3 and 6A-6C, for example, the second reclaiming module 42 of the reclaiming device 4 may further move a ball B from the first carrier 21 of the first conveying device 2 to the second carrier 31 of the marking device 3. The second reclaiming module 42 may include a second base 421 and a second reclaiming element 422 disposed on the second base 421 and configured to move the ball B. For example, the second reclaim element 422 may be a suction cup and the suction cup may be used to draw the ball B and move the ball B. It should be noted that the suction cup having the suction function is a technology known to those skilled in the art, and details are not described herein again. In addition, the second reclaiming module 42 may further include a track (not shown), and the second base 421 may be slidably disposed on the track, thereby causing displacement of the second base 421 on the track. The displacement of the second reclaiming element 422 may be driven together. In addition, the manner of displacement of the second base 421 on the track is a technique known to those skilled in the art, and details are not described herein again. In addition, it should be noted that although the present disclosure is exemplified by the second reclaiming module 42 of the reclaiming device 4 for moving one ball B at a time, in other embodiments, the reclaiming device 4 may also have multiple reclaiming modules 42 for moving a plurality of balls B at the same time, and the disclosure is not limited thereto.

Next, referring to FIGS. 3, 6D, 9A, and 9B, the marking device 3 may be adjacent to the first conveying device 2. In addition, the present disclosure will use the marking device 3 as a disc transporting pad printer. As an example, the marking device 3 may include the second carrier 31 that may carry the ball B and a marking module 32 that may mark an identification mark M on a predetermined area P of the ball B. The predetermined area P may be located on the outer surface BS of the ball B, and the equator of the ball B may pass through the predetermined area P. In addition, for example, the labeling module 32 may be a pad printing machine or other machine having a printing function or a marking function, and the disclosure is not limited thereto. In other embodiments, the second carrier 31 of the marking device 3 may also be disposed on the first conveying module 22 of the first conveying device 2, so that the ball B may be continuously conveyed by the first conveying module 22, and the marking module 32 may be utilized.

Figure 7:
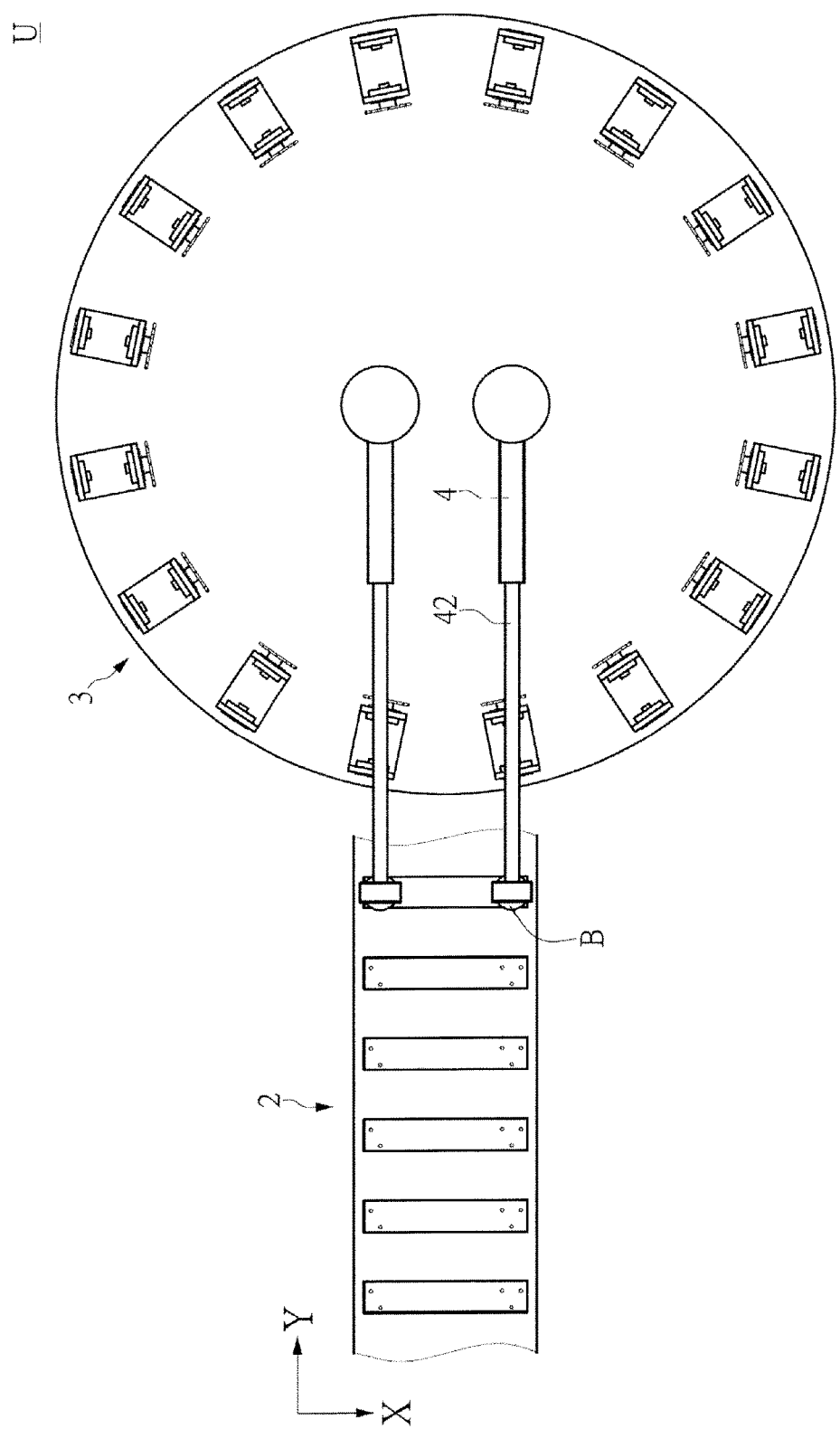
FIG. 7 is a schematic view showing another embodiment of the first conveying device and the marking device of the ball center of gravity position indicating device according to the first embodiment.

Next, refer to FIG. 7. FIG. 7 is a schematic view showing another embodiment of the first conveying device 2 and the marking device 3 of the ball center of gravity position indicating device U. In the first embodiment shown in FIG. 6A, a disc transporting pad printer of the marking device 3 with 24 sets of second carriers 31 is exemplified, for example, but in the second embodiment shown in FIG. 7, the disc transporting pad printer may have 16 sets of second carriers 31, for example. The disc transporting pad printer of the marking device 3 is one example. Other transport pad shapes of the marking device 3 are contemplated. In addition, in the embodiment of FIG. 6A, the second reclaiming module 42 of the reclaiming device 4 moves one ball B at a time as an example. However, in the embodiment of FIG. 7, the reclaiming device 4 may have the two sets of second reclaiming module 42 moving two balls B at a time to the disc transporting pad printer of the marking device 3, and the disclosure is not limited thereto.

Figure 8A:
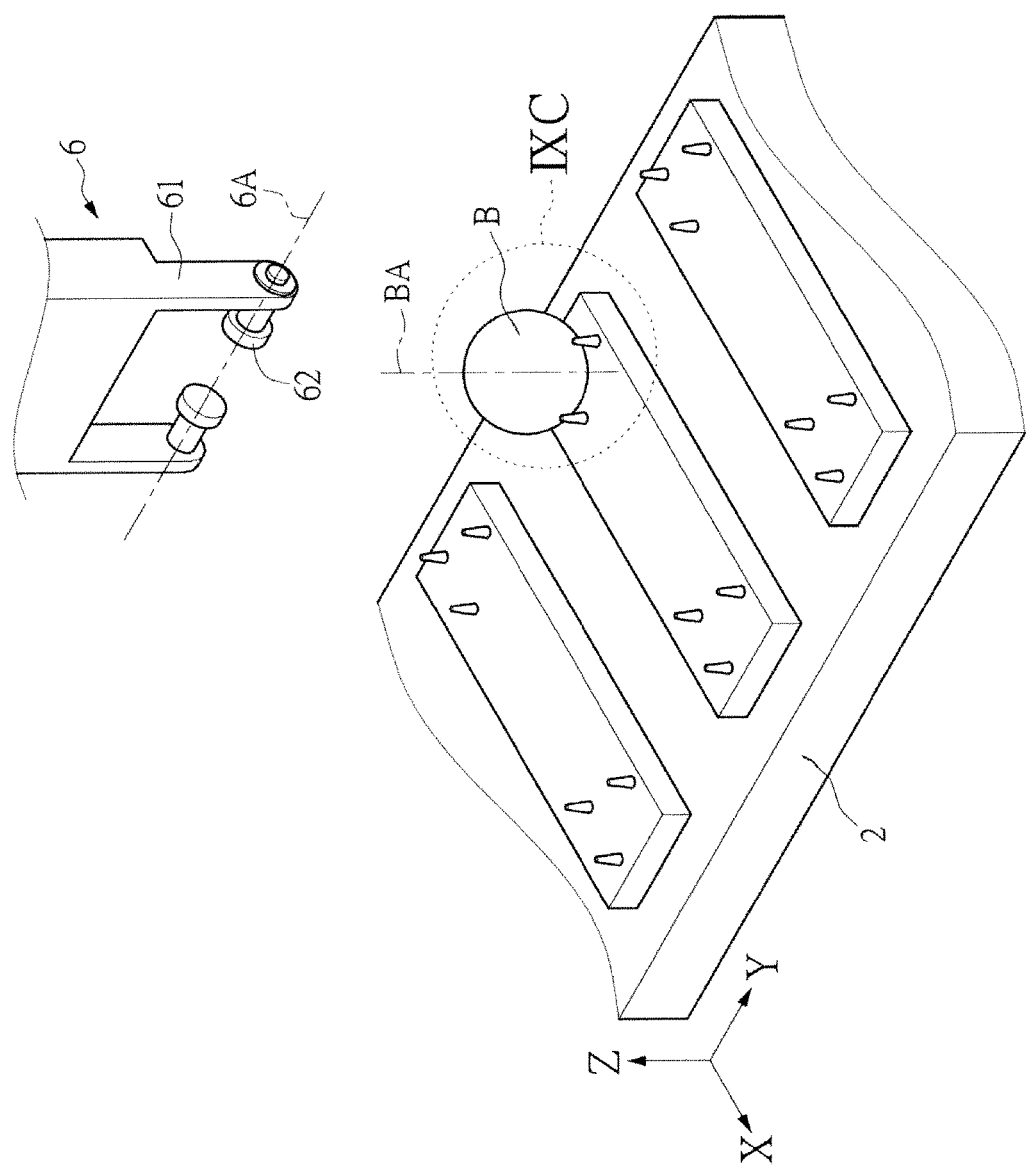
FIGS. 8A to 8D are schematic diagrams showing a displacement process of a ball from a ball center of gravity position indicating device according to the first embodiment, which is rotated by a first turning device and a second turning device.
Figure 8B:
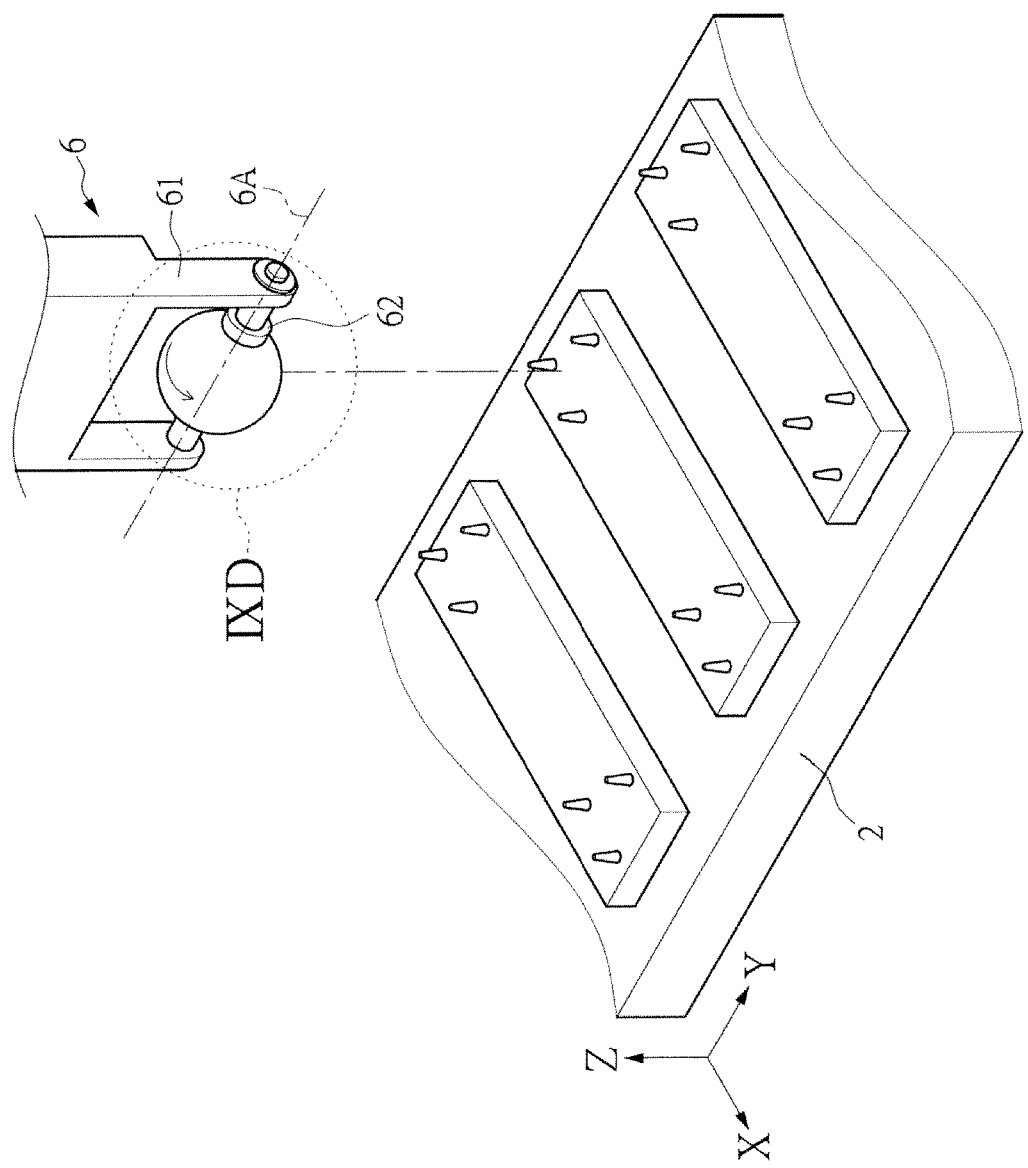
Figure 8C:
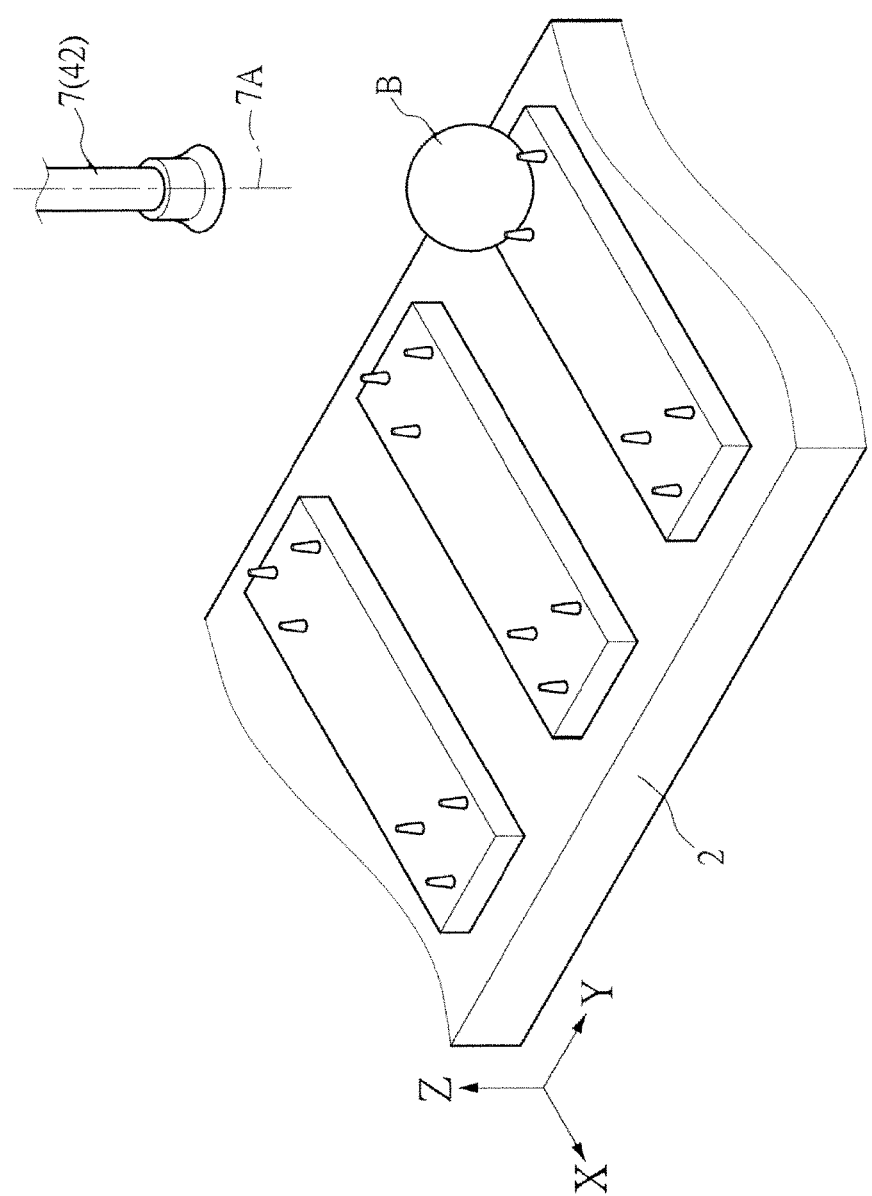
Figure 8D:
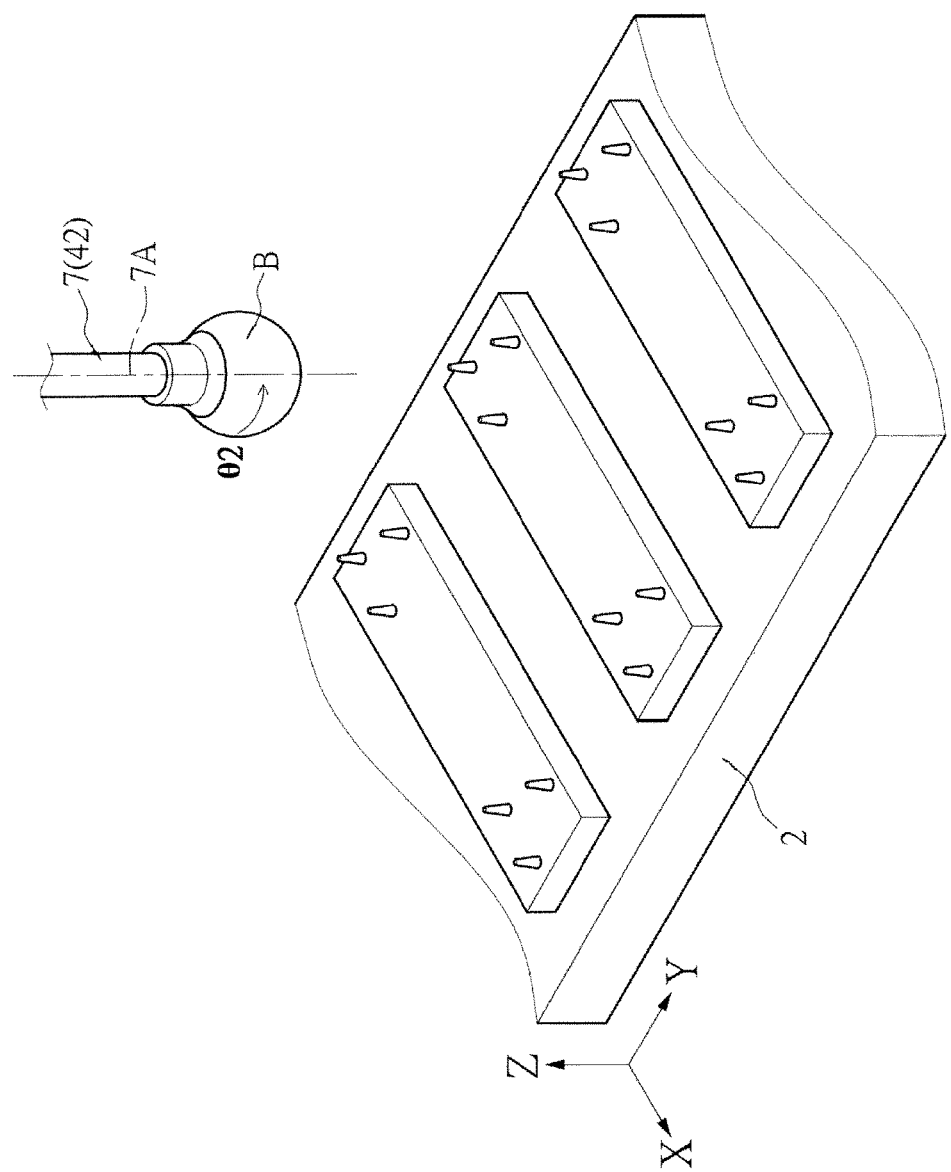
Figure 9D:
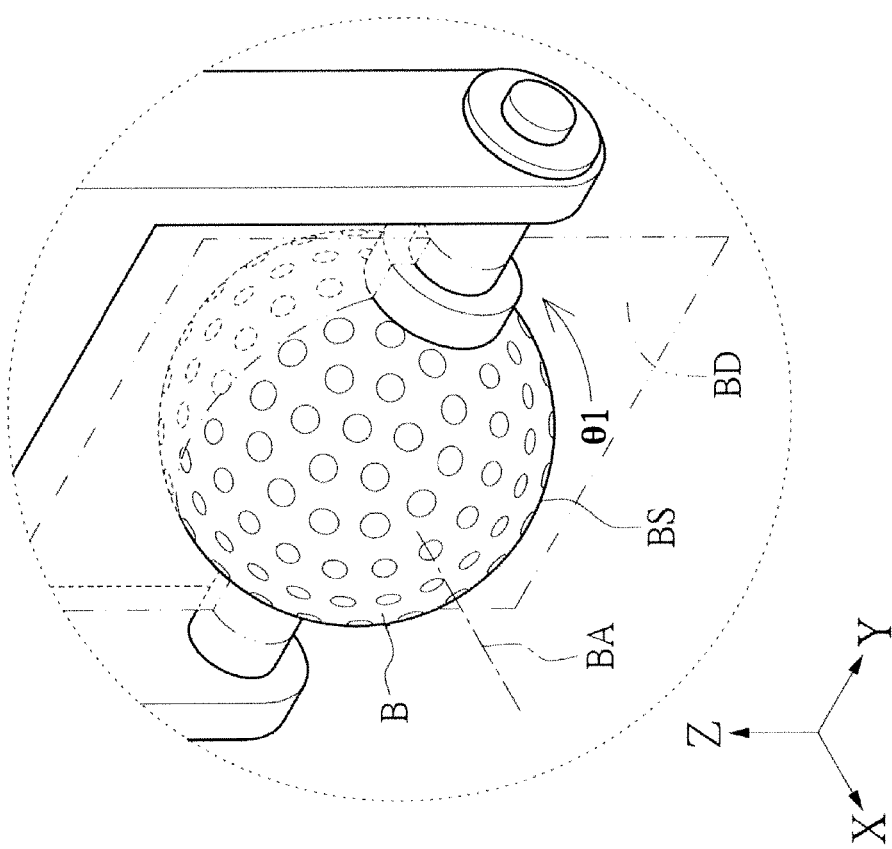
FIG. 9D is a partially enlarged perspective view of the IXD area of FIG. 8B.
Figure 9C:
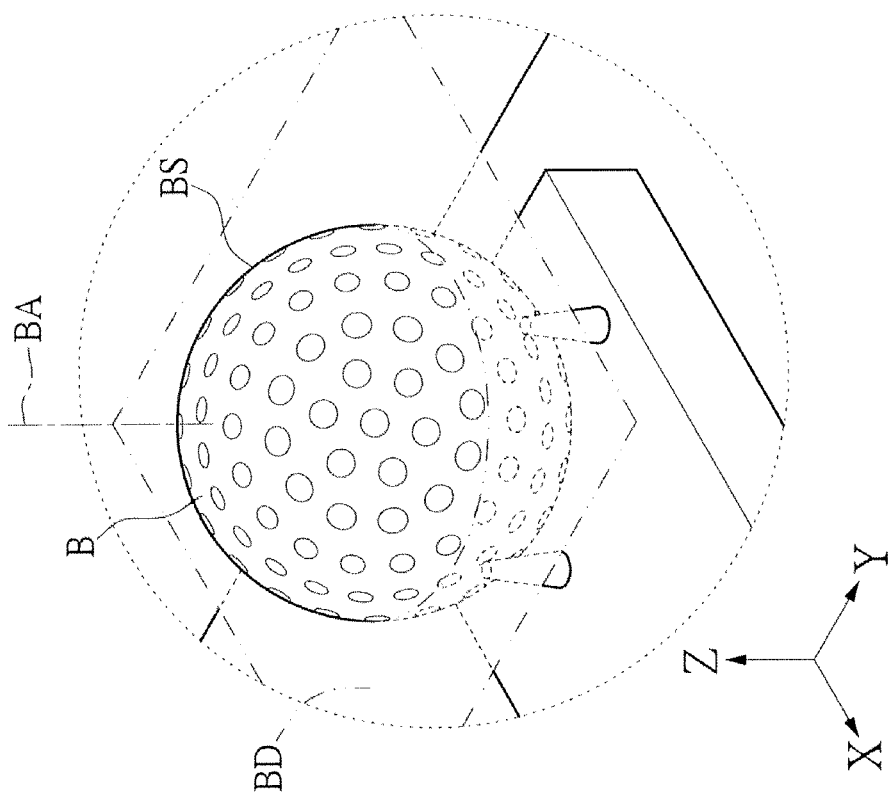
FIG. 9C is a partially enlarged perspective view of the IXC area of FIG. 8A.

Next, refer to FIGS. 6B-6D, 8A-8D, and 9C-9D together. FIGS. 8A-8D are schematic diagrams showing a displacement process of a ball B from a ball center of gravity position indicating device U according to the first embodiment. FIG. 9C is a partially enlarged perspective view of the IXC area of FIG. 8A, and FIG. 9D is a partially enlarged perspective view of the IXD area of FIG. 8B. In addition, since the marking device 3 is exemplified by a disc transporting pad printer, the ball center of gravity position indicating device U may further include a turning device in order to cooperate with the printing mode of the disc transporting pad printer. A first turning device 6 and a second turning device 7 may be used sequentially to adjust the position the ball B to facilitate the printing by the disc transporting pad printer.

In the above, as shown in FIGS. 8A, 8B, 9C and 9D, the first turning device 6 may be adjacent to the first conveying device 2. For example, the first turning device 6 may be disposed above the first conveying module 22 of the first conveying device 2 to adjust the position of the ball B. Further, the first turning device 6 may include a seat body 61 and a holder 62 disposed on the seat body 61 and rotatable corresponding to the seat body 61. The holder 62 may hold the ball B to rotate the ball B along a first axis of rotation 6A of the first turning device 6 by a first angle of rotation θ1 between 85 degrees and 95 degrees. For example, the first angle of rotation θ1 may be 90 degrees. Further, the first axis of rotation 6A may be perpendicular to the central axis BA of the ball B, and the first axis of rotation 6A may be parallel to the reference plane BD. Thereby, after the ball B rotated by the rotating device 1 passes through the rotation of the first turning device 6, the reference plane BD of the ball B may be perpendicular to an initial plane (in the drawing, the initial plane may be the XY plane). Further, when the ball B is rotated by the first turning device 6, the ball may be returned to the first conveying device 2 to facilitate the second turning device 7 to perform the sequential steps.

As shown in FIG. 8C and FIG. 8D, the second turning device 7 may be adjacent to the first turning device 6, and the second turning device 7 may adsorb (e.g., hold and lift) the ball B to turn the ball B along the second turning device 7. A second axis of rotation 7A is rotated by a second angle of rotation θ2 between 5 and 10 degrees. For example, the second angle of rotation θ2 may be 7.5 degrees. Further, the second axis of rotation 7A of the second turning device 7 may be perpendicular to the first axis of rotation 6A of the first turning device 6, and the second axis of rotation 7A may be substantially parallel to the reference plane BD in this intermediate orientation. In addition, when the ball B is rotated by the second turning device 7, the ball B may be returned to the first conveying device 2, so that the orientation of the ball B corresponding to the second reclaiming module 42 of the reclaiming device 4 may have been rotated by the second turning device 7. The ball B is then moved to the marking device 3 by the reclaiming device 4.

In view of the above, it should be particularly noted that since the marking device 3 is a disc transporting pad printer having 24 sets of second carriers 31, it is necessary to further drive the second angle of rotation θ2 of the ball B by 7.5 degrees along the second axis of rotation 7A. However, if the identification mark M is marked on the ball B by a linear transport pad printer (not shown), there may be no need to rotate the ball B. In other words, in order to cooperate with the arrangement of the marking device 3, the position of the ball B may be adjusted by the first turning device 6 and the second turning device 7. However, it should be particularly noted that although the present disclosure is exemplified by a disc transporting pad printer having 24 sets of second carriers 31, it is thus necessary to further turn the ball B to rotate 7.5 degrees along the second axis of rotation 7A. However, in other embodiments, the rotation angle of the second angle of rotation θ2 may be adjusted according to the specifications of the disc transporting pad printer.

Next, refer to FIGS. 6B, 6C, 8C, and 8D, the second reclaiming module 42 and the second turning device 7 of the reclaiming device 4 in the above-mentioned examples belong to different components, respectively. In other embodiments, in order to simplify the number of times the ball B is moved to help the positioning of the ball B to be more accurate, the second reclaiming module 42 of the reclaiming device 4 may have the function of the second turning device 7. In other words, the second reclaiming module 42 of the reclaiming device 4 may be integrated with the second turning device 7 into the same component, that is, the reclaiming device 4 may sequentially lift and turn the ball B from the first carrier 21 of the first conveying device 2 during the movement of the ball B to the second carrier 31 of the marking device 3, such that the ball B may be rotated together by a rotation angle of between 5 and 10 degrees. That is, the reclaiming device 4 may include a first reclaiming module 41 for moving the ball B rotated by the rotating device 1 to the first conveying device 2 and the ball B of the first conveying device 2 is moved by the second reclaiming module 42 of the marking device 3. In addition, the second reclaiming module 42 is adjacent to the first conveying device 2, and the second reclaiming module 42 may adsorb (e.g., lift and hold) the ball B to rotate the ball B.

Figure 8E:
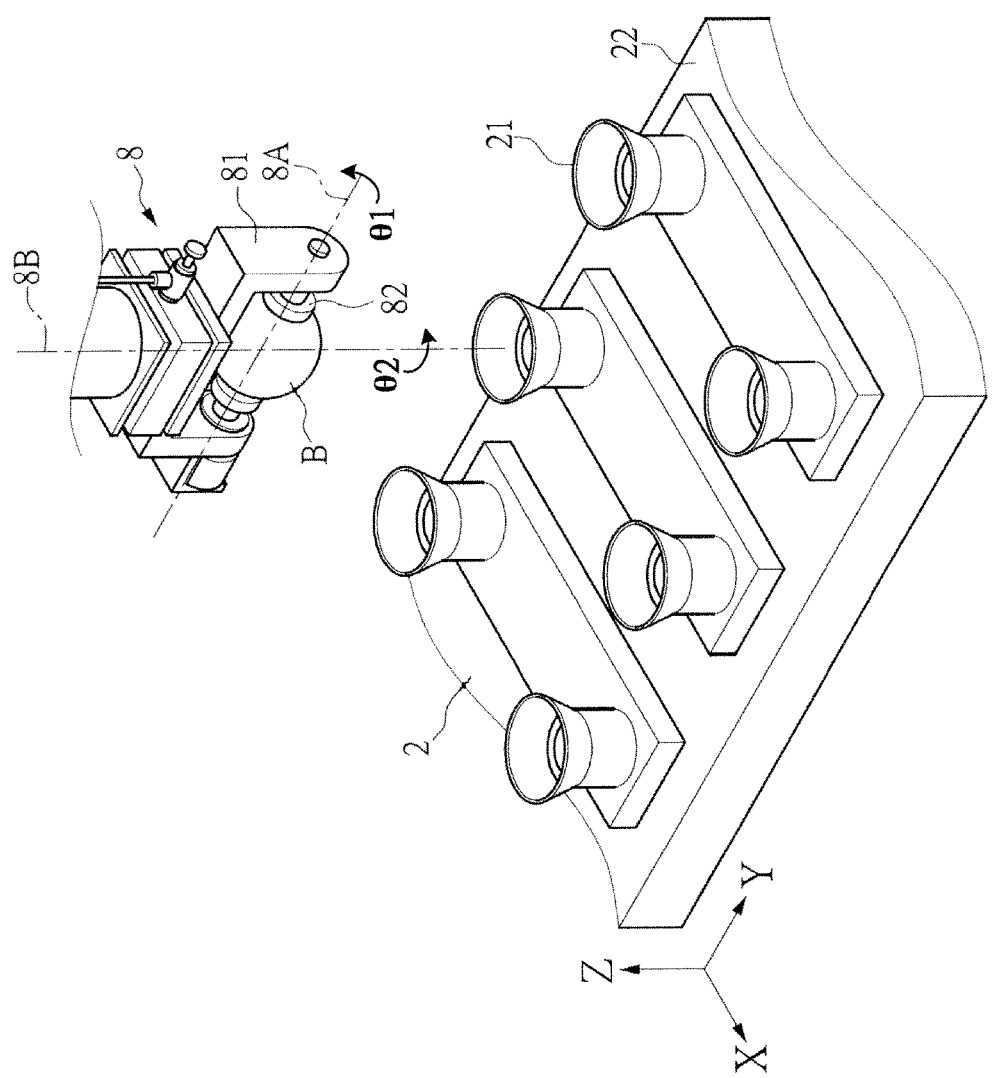
FIG. 8E is a perspective view of a rotating assembly of a ball center of gravity position indicating device according to the first embodiment.

Next, refer to FIGS. 8A-8E together. FIG. 8E is a perspective view of a rotating component of the ball center of gravity position indicating device U according to the first embodiment. In detail, in other embodiments, in order to simplify the number of times the ball B is moved to help the positioning of the ball B more accurately, a rotating assembly 8 as illustrated in FIG. 8E may have both a first turning device and a second turning device in the same assembly. In other words, the rotating assembly 8 may rotate the ball B along a first axis of rotation 8A and a second axis of rotation 8B.

In the above, refer to FIG. 8E. Further, the rotating assembly 8 may be adjacent to the first conveying device 2. For example, to adjust the position of the ball B the rotating assembly 8 may be disposed above the first conveying module 22 of the first conveying device 2. The rotating assembly 8 may include a seat body 81 and a holder 82 disposed on the seat body 81 and rotatable relative to the seat body 81. The holder 82 may clamp the ball B to rotate the ball B along a first axis of rotation 8A of the rotating assembly 8 by a first angle of rotation θ1 between 85 degrees and 95 degrees. For example, the first angle of rotation θ1 may be 90 degrees. Further, the first axis of rotation 8A may be perpendicular to the central axis BA of the ball B, and the first axis of rotation 8A may be parallel to the reference plane BD. Thereby, after the ball B rotated by the rotating device 1 passes through the rotation of the rotating assembly 8, the reference plane BD of the ball B may be perpendicular to an initial plane (in the drawing, the initial plane may be the XY plane).

As described above, referring to FIG. 8E, the rotating assembly 8 may not only grip the ball B by the holder 82, but may also rotate the ball B along a first axis of rotation 8A of the rotating assembly 8. At the same time, the ball B may be clamped by the holder 82, and the seat body 81 may be rotated at the same time to rotate the ball B along a second axis of rotation 8B of the rotating assembly 8 by a second angle of rotation θ2 between 5 and 10 degrees. For example, the second angle of rotation θ2 may be 7.5 degrees. Further, the second axis of rotation 8B of the rotational assembly 8 may be perpendicular to the first axis of rotation 8A of the rotational assembly 8, and the second axis of rotation 8B may be substantially parallel to the reference plane BD in this intermediate orientation. In addition, when the ball B is rotated along the second axis of rotation 8B by the rotating assembly 8, the ball B may be returned to the first conveying device 2, so that the second reclaiming module 42 of the reclaiming device 4 will maintain the new orientation of the ball B. The ball B after the rotation of the assembly 8 is moved to the marking device 3. Thereby, since the rotating assembly 8 may rotate the ball B along a first axis of rotation 8A and a second axis of rotation 8B of the rotation assembly 8. Therefore, the number of times the ball B is moved may be reduced as compared with the case where the ball B is rotated by the first turning device 6 and the second turning device 7 sequentially.

Figure 8F:
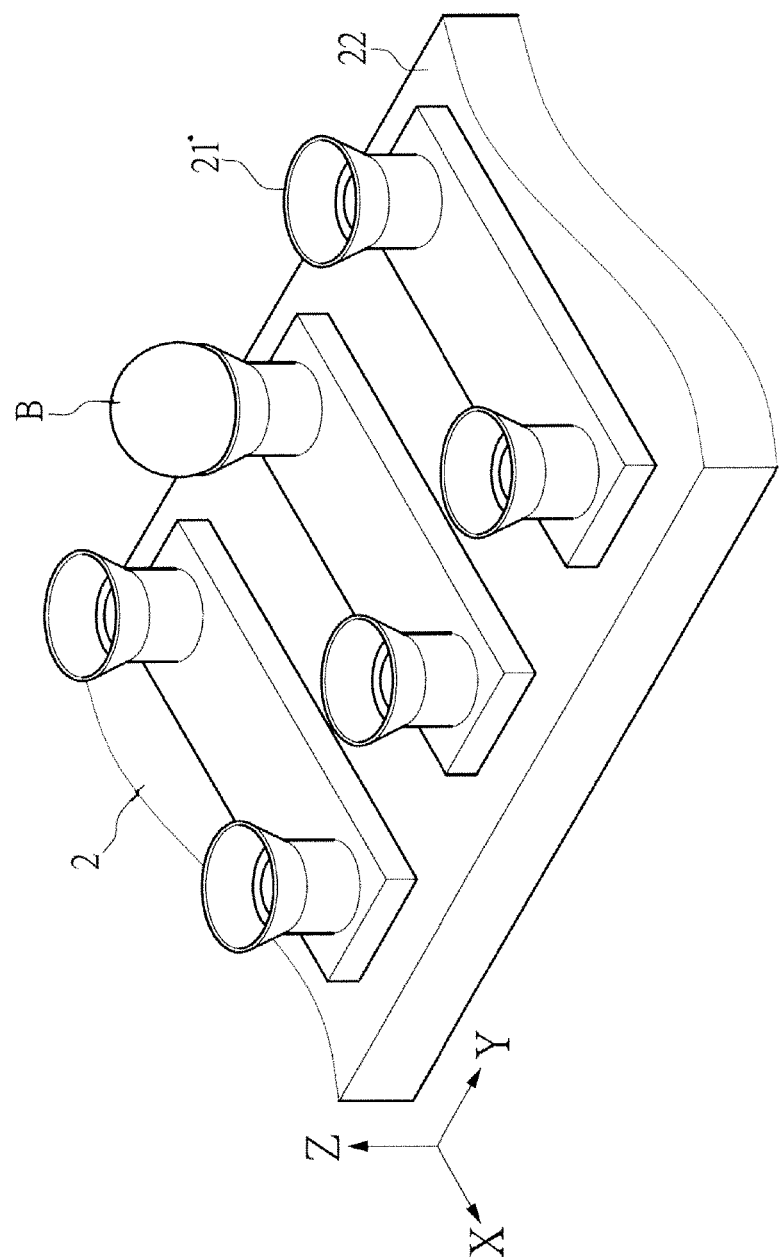
FIG. 8F is a partial perspective view showing another embodiment of the first conveying device of the ball center of gravity position indicating device according to the first embodiment.

Next, refer to FIGS. 1 and 8F. FIG. 8F is a partial perspective view of another embodiment of the first conveying device 2 of the ball center of gravity position indicating device U according to the first embodiment. An alternate first carrier 21' having another form may be used, compared to the needle-shaped carrier 21 shown in FIG. 1. The alternate first carrier 21' of the first conveying device 2 may be a carrier in the form of a disk (for example a flexible suction cup). Thereby, the ball B may be further prevented from shaking. Furthermore, it should be noted that, in the context, preferably, the alternate first carrier 21' of the first conveying device 2 may be a disk-shaped carrier to avoid swaying of the ball B after rotation. In addition, the third carrier 51 of the second conveying device 5 may have another form, for example, a needle-shaped carrier or a disk-shaped carrier.

Next, as shown in FIG. 2, the ball center of gravity position indicating device U may further include a first sensing device S1 and a second sensing device S2. The first sensing device S1 and a second sensing device S2 may be disposed adjacent to the rotating device 1. For example, the first sensing device S1 may be used to sense whether there is a ball B in the receiving groove 10 in the rotating device 1, thereby determining whether the ball B has been moved to the first conveying device 2 by the first reclaiming element 412. Therefore, if the ball B remains in the receiving groove 10 without being moved to the first conveying device 2, the first sensing device S1 may emit a signal to control the ball center of gravity.

In view of the above and referring to FIG. 2, it is worth noting that after the first reclaiming element 412 moves the ball B rotated by the rotating device 1 onto the first carrier 21, the reclaiming device 4 may be moved again to above the second conveying device 5. In order to prevent a malfunction, it is important prevent the first reclaiming element 412 of the reclaiming device 4 from moving back over the second conveying device 5 when a ball B is still held by the abutting member 433 of the deceleration module 43 and was not properly placed on a first carrier 21 of the first conveying device 2. The second sensing device S2 may be used to sense whether the reclaiming device 4 moving back to the second conveying device 5 has a ball B to avoid malfunction. Therefore, if the ball B is still held by the abutting member 433 of the deceleration module 43, the second sensing device S2 may send a signal to control the ball center of gravity position indicating device U to stop, to avoid subsequent malfunction.

Next, referring to FIGS. 9A and 9B, a predetermined area P of the ball B may have an identification mark M, and the position of the identification mark M may be located on the equator of the ball B. Thereby, when the user strikes, the equator of the ball B may be directed upward, and when the ball B is struck, the inertia effect of the center of gravity BG of the ball B may be avoided, and the ball B may be shifted to the left or right.

Figure 10:
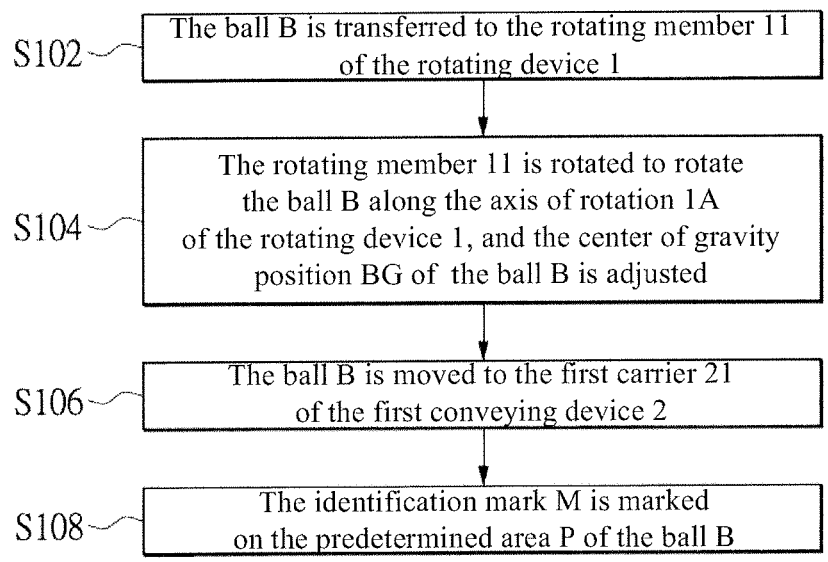
FIG. 10 is a flowchart of a method for marking a ball center of gravity position according to a second embodiment.

First, referring to FIG. 10, a flowchart of a ball center of gravity position indication method is presented according to a second embodiment. A second embodiment provides a ball center of gravity position indication method for marking a corresponding position of a center of gravity BG of a ball B on a ball B. The indication method for marking a ball center of gravity position is as follows. In addition, for example, the ball center of gravity position indication method may be marked by using the ball center of gravity position indicating device U provided in the above first embodiment, but the disclosure is not limited thereto.

Next, referring to FIGS. 4A-4D and 5A-5C, as shown in step S102, the ball B is transferred to a rotating member 11 of a rotating device 1. For example, the first reclaiming element 412 of the first reclaiming module 41 of the reclaiming device 4 may be used to move one or more balls B that have not been rotated by the rotating device 1 from the second conveying device 5 to the rotating member 11 of the rotating device 1.

Next, referring to FIGS. 4A-4D and 5A-5C, as shown in step S104, the rotating member 11 is rotated to rotate the ball B along the axis of rotation 1A, and the center of gravity position BG of the ball B with respect to the rotating device 1 is adjusted. The center of gravity BG of the ball B corresponds to the position of the rotating device 1. For example, the driving member 12 of the rotating device 1 may be used to drive the rotation of the rotating member 11. Thereby, when the rotating member 11 drives the ball B provided on the rotating member 11 to rotate, it may utilize the principle of centrifugal force, and the center of gravity BG of the adjusting ball B corresponds to the position of the rotating device 1. Therefore, as can be seen from the comparison between FIG. 5A and FIG. 5B, the reference plane BD of the ball B that has been rotated by the rotating device 1 may be perpendicular to the axis of rotation 1A of the rotating device 1. The reference plane BD may be parallel to an initial plane (in the drawings, the initial plane may be an XY plane), and the axis of rotation 1A of the rotating device 1 may be parallel to the central axis BA of the ball B.

Next, referring to FIGS. 4A-4D, as shown in step S106, the ball B is moved to the first carrier 21 of the first conveying device 2. For example, the ball B that has been rotated by the rotating device 1 may be moved to a first carrier 21 of a first conveying device 2 by a first reclaiming element 412 of the reclaiming device 4.

Figure 6D:
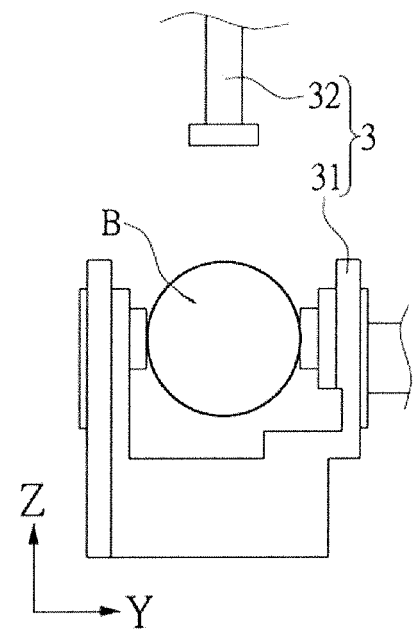
FIG. 6D is a side elevational view showing the marking device of the ball center of gravity position indicating device according to the first embodiment.

Next, referring to FIG. 6D, as shown in step S108, an identification mark M is marked on a predetermined area P of the ball B. Further, the predetermined area P may be located on the outer surface BS of the ball B, and the equator of the ball B may pass through the predetermined area P. Thereby, the corresponding center of gravity position BG of the ball B is indicated. For example, the marking device 3 may be used to mark the identification mark M on the ball B, but the disclosure is not limited thereto. In other embodiments, the identification mark M may be marked on the ball B using a pad printing machine such as, but not limited to, a linear transport pad printer or other machine having a printing function or a marking function.

Figure 11A:
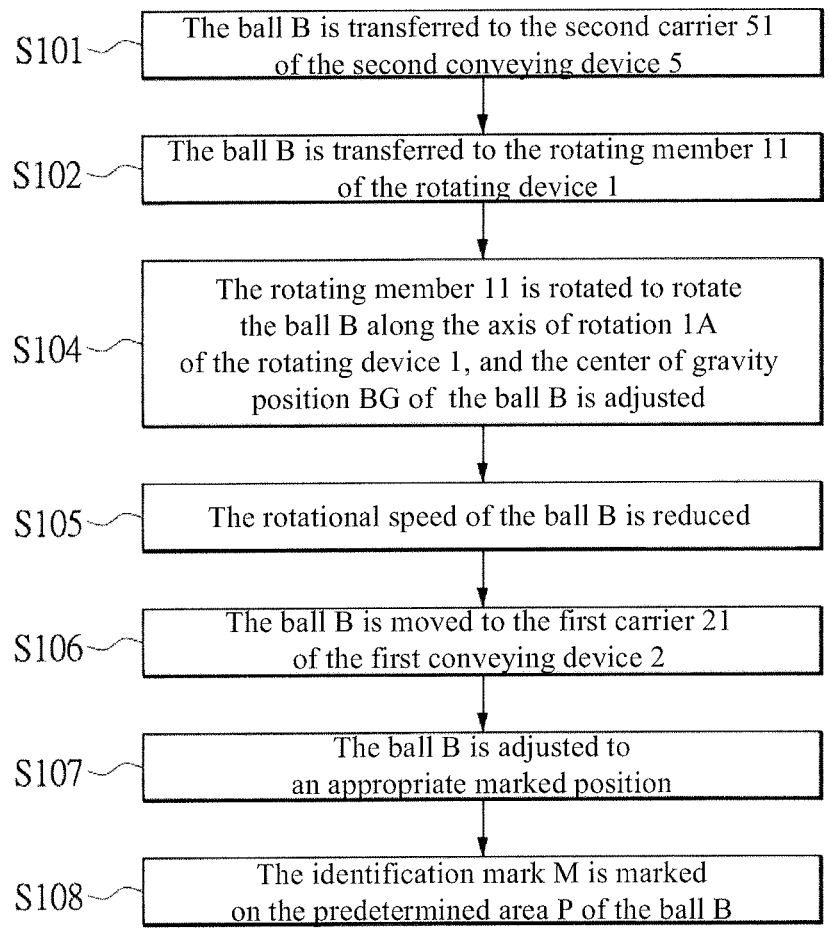
FIG. 11A is a flowchart of a method for marking a ball center of gravity position according to a third embodiment.
Figure 11B:
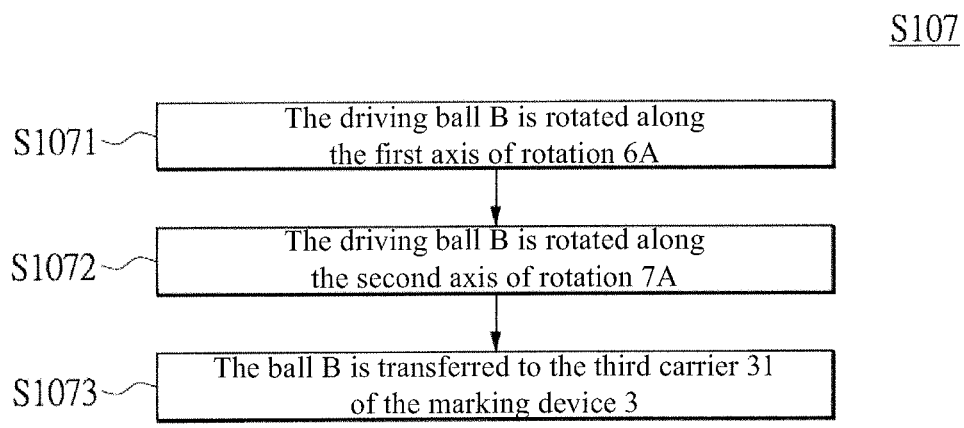
FIG. 11B is a flowchart of step S107 of the ball center of gravity position indication method according to the third embodiment.

Second, referring to FIGS. 11A and 11B, a flowchart of a ball center of gravity position indication method according to a third embodiment is presented. FIG. 11B is a more detailed step S107 of the ball center of gravity position indication method according to the third embodiment. A third embodiment provides a ball center of gravity position indication method for indicating a corresponding position of a center of gravity BG of a ball B on a ball B. In addition, as can be seen from the comparison between FIG. 11A and FIG. 10, in the embodiment of FIG. 11A, step S101, step S105, and step S107 may be further included, and the differences will be further described below. In addition, for example, the ball center of gravity position indication method may be marked by using the ball center of gravity position indicating device U provided in the above first embodiment, but the disclosure is not limited thereto.

Next, referring to FIGS. 4A-4D and 5A-5C, as shown in step S101, the ball B is transferred to the third carrier 51 of the second conveying device 5. For example, one or more balls B may be moved to the third carrier 51 of the second conveying device 5 by a conveyor belt (not shown), and the third carrier 51 may be driven by the second conveying module 52.

Next, referring to FIGS. 4A-4D and 5A-5C, as shown in step S102, the ball B is transferred to the rotating member 11 of the rotating device 1. Next, as shown in step S104, the rotating member 11 is rotated to rotate the ball B along the axis of rotation 1A, and the center of gravity position BG of the ball B with respect to the rotating device 1 is adjusted. It should be noted that step S102 and step S104 are similar to the foregoing embodiment, and details are not described herein again.

Next, referring to FIGS. 5A-5C, as shown in step S105, the rotational speed of the ball B is reduced (e.g., deceleration). Since the ball B rotated by the rotating device 1 has not stopped rotating, in this step, the deceleration module 43 of the reclaiming device 4 may be used to abut against the ball B to lower the rotational speed of the ball B.

Next, referring to FIGS. 4A-4D, as shown in step S106, the ball B is moved to the first carrier 21 of the first conveying device 2. It should be noted that step S106 is similar to the foregoing embodiment, and details are not described herein again. In addition, it is worth noting that after the first reclaiming element 412 moves the ball B that has been rotated by the rotating device 1 onto the first carrier 21, the reclaiming device 4 may be moved to the upper side of the second conveying device 5. The step of transferring the ball B to a rotating member 11 of a rotating device 1 is performed by repeating step S102.

Next, referring to FIGS. 8A-8D, as shown in step S107, the ball B is adjusted to an appropriate marked position. Further, the ball B may be adjusted to an appropriate position for marking by the marking device 3 in accordance with the marking device 3 provided in the subsequent marking step.

In the above, refer to FIGS. 8A-8D and FIG. 11B. For example, the present disclosure is exemplified by the marking device 3 being a disc transporting pad printer. Therefore, in order to cooperate with the printing mode of the disc transporting pad printer, the ball B may be adjusted to an appropriate position by a first turning device 6, a second turning device 7, and/or a second reclaiming module 42.

In the above, referring to FIGS. 8A and 8B, as shown in step S1071, the driving ball B is rotated along the first axis of rotation 6A. For example, the ball B is rotated along a first axis of rotation 6A of a first turning device 6 by a first angle of rotation θ1 between 85 degrees and 95 degrees. Preferably, the first angle of rotation θ1 may be 90 degrees.

In the above, referring to FIGS. 8C and 8D, as shown in step S1072, the driving ball B is rotated along the second axis of rotation 7A. For example, the ball B is rotated along a second axis of rotation 7A of a second turning device 7 by a second angle of rotation θ2 between 5 and 10 degrees. Preferably, the second angle of rotation θ2 may be 7.5 degrees. Further, the second axis of rotation 7A of the second turning device 7 may be perpendicular to the first axis of rotation 6A of the first turning device 6. In addition, it should be noted that in other embodiments, the order of execution of steps S1071 and S1072 may be reversed. That is to say, the ball B may be driven to rotate along the second axis of rotation 7A, and then the ball B is driven to rotate along the first axis of rotation 6A, which is not limited thereto.

In the above, as shown in FIGS. 6B and 6C, as shown in step S1073, the ball B is transferred to the second carrier 31 of the marking device 3. In other words, the ball B that has been rotated along the first axis of rotation 6A of the first turning device 6 and/or rotated along the second axis of rotation 7A of the second turning device 7 may be transferred to a second carrier 31 of the marking device 3.

Figure 11C:
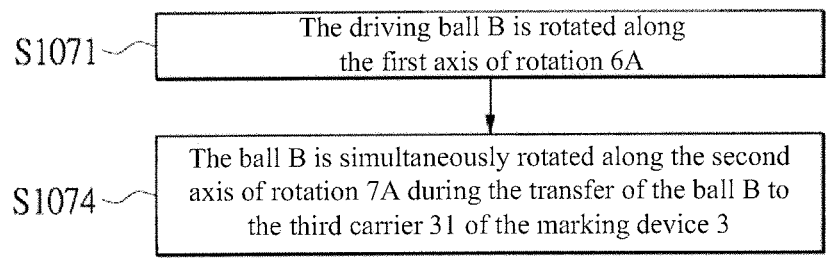
FIG. 11C is another flowchart of step S107 of the ball center of gravity position indication method according to the third embodiment.

In addition, referring to FIG. 11C, FIG. 11C is another flowchart of step S107 of the ball center of gravity position indication method according to the third embodiment. It should be noted that, in another embodiment, step S1072 and step S1073 may be performed simultaneously. In other words, as shown in step S1074, the ball B is transferred to the second carrier 31 of the marking device 3 and the ball B is rotated along the second axis of rotation 7A. In other words, the ball B may be simultaneously rotated along the second axis of rotation 7A during the transfer of the ball B to the second carrier 31 of the marking device 3. That is, as explained in the foregoing embodiment, the second reclaiming module 42 of the reclaiming device 4 may be integrated with the second turning device 7 into the same component, that is, the reclaiming device 4 may be located adjacent to the first conveying device 2. During the movement of the ball B on the first carrier 21 to the second carrier 31 of the marking device 3, the ball B may be rotated together by a rotation angle of between 5 and 10 degrees.

In addition, in other embodiments, the steps of rotating the ball B along the first axis of rotation 6A and rotating the ball B along the second axis of rotation 7A may be simultaneously performed as shown in steps S1071 and S1072. In other words, the rotating member 8 shown in FIG. 8E may be used to rotate the ball B along the first axis of rotation 8A and the second axis of rotation 8B of the rotational assembly 8 to achieve the effect of adjusting the ball B to the appropriate marked position.

Next, referring to FIG. 6D, as shown in step S108, an identification mark M is marked on a predetermined area P of the ball B. It should be noted that step S108 is similar to the foregoing embodiment, and details are not described herein again. In addition, in the embodiment of FIGS. 11A and 11B, step S101, step S105, and step S107 are further included in FIG. 10, however, in other embodiments, step S101, step S105, and/or step S107 may be selectively performed.

In addition, it should be particularly noted that although the above embodiment only uses one ball B, for example, in other embodiments, the ball center of gravity position indicating device U may also move a plurality of balls B at a time. The center of gravity BG of the plurality of balls B may be adjusted at one time corresponding to the position of the rotating device 1. In other words, as shown in FIGS. 1 to 3, the second conveying device 5 may have a plurality of third carriers 51, and the plurality of balls B may be respectively disposed on the third carrier 51. Then, the plurality of balls B may be moved by the plurality of first reclaiming modules 41 of the reclaiming device 4 into the plurality of receiving grooves 10 of the rotating device 1. Thereby, the plurality of rotating members 11 of the rotating device 1 may respectively drive the rotation of the plurality of balls B. Then, the plurality of balls B rotated by the rotating device 1 may be moved to the plurality of first carriers 21 on the first conveying device 2. Further, the plurality of balls B may be moved to the marking device 3 again. It is worth mentioning that in order to adjust the center of gravity BG of the ball B by the centrifugal force corresponding to the rotation device 1, the rotational speed of the ball B needs to reach a predetermined speed (for example, but not limited to, 10,000 RPM or more), and the rotation time of the ball B needs to reach a predetermined time (for example, but not limited to, 21 seconds or more). Therefore, only the first angle of rotation θ1 and the second angle of rotation θ2 of one or two balls B may need to be adjusted at a time. That is to say, it is also possible to move only one or two balls B to the marking device 3 at a time. However, it should be noted that the present disclosure is not limited by the above examples.

One of the advantageous effects of the ball center of gravity position indicating device U and method provided by the embodiment, is the ability to adjust the center of gravity position BG of the ball B corresponding to the position of the rotating device 1, the ability to mark a predetermined area P on the ball B with a recognition symbol M, and the ability to produce a ball B having the identification mark M. Thereby, through the identification mark M on the ball B, the user may know the ball center of gravity position, and may adjust the striking position of the ball B according to the necessity.

The above disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A ball center of gravity position indicating device for indicating a corresponding position of a center of gravity of a ball on the ball, the ball center of gravity position indicating device comprising:
   a rotating device comprising:
      a receiving groove for accommodating the ball,
      a rotating member capable of carrying the ball and disposed in the receiving groove, and
      a driving member capable of driving the rotating member to rotate the ball,
      wherein the ball is rotatable along an axis of rotation of the rotating device to adjust a ball center of gravity position corresponding to the rotating device;
   a first conveying device comprising:
      a first carrier capable of carrying the ball, and
      a first member capable of driving the displacement of the first carrier;
   a marking device comprising:
      a second carrier capable of carrying the ball, and
      a marking module capable of marking an identification mark on the ball; and
   a reclaiming device that:
      is configured to lift or draw the ball from the receiving groove when the ball is in the receiving groove;
      is movable between the rotating device and the first conveying device for moving the ball that has been rotated by the rotating device to the first carrier of the first conveying device and placing the ball in the first carrier of the first conveying device,
      is configured to lift or draw the ball from the first carrier of the first conveying device when the ball is in the first carrier of the first conveying device, and
      is movable between the first conveying device and the marking device for moving the ball to the second carrier of the marking device; and
      is configured to maintain an orientation of the ball as the ball is moved between the first conveying device and the marking device.

2. The ball center of gravity position indicating device of claim 1, wherein:
   the ball further comprises:
      a core center,
      a reference plane passing through the center of gravity and the core center, and
      a central axis passing through the core center and perpendicular to the reference plane;
   the reference plane of the ball, when rotated by the rotating device, is perpendicular to the axis of rotation of the rotating device and
   parallel to an initial plane;
and
   the axis of rotation of the rotating device is parallel to the central axis of the ball.

3. The ball center of gravity position indicating device of claim 2, further comprising a first turning device comprising:
   a seat body; and
   a holder disposed on the seat body and rotatable corresponding to the seat body;
wherein:
   the holder is capable of clamping the ball to rotate the ball along a first axis of rotation of the first turning device by a first angle of rotation between 85 degrees and 95 degrees, and
   the reference plane of the ball rotated by the first turning device is perpendicular to the initial plane.

4. The ball center of gravity position indicating device of claim 3, further comprising:
   a second turning device, wherein:
      the second turning device is capable of rotating the ball along a second axis of rotation of the second turning device by a second angle of rotation between 5 degrees and 10 degrees, and
      the second axis of rotation of the second turning device is perpendicular to the first axis of rotation of the first turning device.

5. The ball center of gravity position indicating device of claim 3, wherein the reclaiming device comprises:
   a first reclaiming module for moving the ball that has been rotated by the rotating device to the first conveying device; and
   a second reclaiming module for moving the ball located in the first conveying device to the marking device;
wherein:
   the second reclaiming module is adjacent to the first turning device, and
   the second reclaiming module adsorbs the ball to rotate the ball.

6. The ball center of gravity position indicating device of claim 1, wherein:
   the reclaiming device comprises a first reclaiming module for moving the ball that has been rotated by the rotating device to the first conveying device;
   the first reclaiming module comprises:
      a first base,
      a first reclaiming element disposed on the first base and configured to move the ball, and
      a deceleration module;
   the deceleration module is rotatable relative to the first base and may abut against the ball to reduce the rotational speed of the ball.

7. The ball center of gravity position indicating device of claim 6, wherein the deceleration module comprises:
   a bearing disposed on the first base;
   a rod disposed on the bearing; and
   an abutment member for abutting against the ball.

8. The ball center of gravity position indicating device of claim 7, wherein the abutting member comprises a dish shaped suction cup.

9. The ball center of gravity position indicating device of claim 6, wherein:
   the reclaiming device further comprises a second reclaiming device for moving the ball located in the first conveying device to the marking device; and
   the second reclaiming module includes a second base and a second reclaiming element disposed on the second base and configured to move the ball.

10. The ball center of gravity position indicating device of claim 1, further comprising:
   a second conveying device adjacent to the rotating device, the second conveying device comprising a third carrier capable of carrying the ball; and
   a second conveying module capable of driving the displacement of the third carrier.

11. The ball center of gravity position indicating device of claim 10, wherein the reclaiming device is moveable between the second conveying device and the rotating device for use in moving the ball from the third carrier of the second conveying device to the receiving groove of the rotating device.

12. The ball center of gravity indicating device of claim 1, further comprising:
   a track along which the reclaiming device is slidably disposed; and
   wherein the receiving groove of the rotating device is configured to be aligned with the first carrier of the first conveying device when the reclaiming device moves along the track to move the ball from the rotating device to the first carrier.

13. The ball center of gravity indicating device of claim 1, wherein:
   the first conveying device is adjacent to the rotating device; and
   the marking device is adjacent to the first conveying device.

14. A ball center of gravity position indicating device for indicating a corresponding position of a center of gravity of a ball on the ball, the ball center of gravity position indicating device comprising:
   a rotating device comprising:
      a receiving groove for accommodating the ball,
      a rotating member disposed in the receiving groove, and
      a driving member capable of driving the rotating member,
   a first conveying device comprising:
      a first carrier, and
      a first conveying module capable of driving the displacement of the first carrier;
   a marking device comprising:
      a second carrier, and
      a marking module capable of marking an identification mark on the ball; and
   a reclaiming device that:
      is configured to lift or draw the ball from the receiving groove when the ball is in the receiving groove;
      is movable between the rotating device and the first conveying device,
      is configured to lift or draw the ball from the first carrier of the first conveying device when the ball is in the first carrier of the first conveying device, and
      is movable between the first conveying device and the marking device for moving the ball to the second carrier of the marking device; and
      is configured to maintain an orientation of the ball as the ball is moved between the first conveying device and the marking device.

* * * * *